US012606645B2

(12) United States Patent
Park et al.

(10) Patent No.: US 12,606,645 B2
(45) Date of Patent: Apr. 21, 2026

(54) MIXED CATALYTIC COMPOSITION, CATALYST COMPRISING THE SAME, AND PROCESSES FOR PREPARING THE SAME

(71) Applicant: HANWHA SOLUTIONS CORPORATION, Seoul (KR)

(72) Inventors: Ranwha Park, Daejeon (KR); Seongyeon Park, Daejeon (KR); Won Jong Lee, Daejeon (KR); Wook Jeong, Daejeon (KR); Taeho Jeong, Daejeon (KR)

(73) Assignee: HANWHA SOLUTIONS CORPORATION, Seoul (KR)

( * ) Notice: Subject to any disclaimer, the term of this patent is extended or adjusted under 35 U.S.C. 154(b) by 902 days.

(21) Appl. No.: 17/904,961

(22) PCT Filed: Feb. 19, 2021

(86) PCT No.: PCT/KR2021/002144

§ 371 (c)(1),
(2) Date: Oct. 27, 2022

(87) PCT Pub. No.: WO2021/172818

PCT Pub. Date: Sep. 2, 2021

(65) Prior Publication Data

US 2023/0139681 A1 May 4, 2023

(30) Foreign Application Priority Data

Feb. 26, 2020 (KR) ........................ 10-2020-0023520

(51) Int. Cl.

| | |
|---|---|
| ***C08F 4/659*** | (2006.01) |
| ***C08F 4/02*** | (2006.01) |
| ***C08F 4/64*** | (2006.01) |
| ***C08F 4/6592*** | (2006.01) |
| ***C08F 4/76*** | (2006.01) |

(52) U.S. Cl.

CPC ............ *C08F 4/65925* (2013.01); *C08F 4/02* (2013.01); *C08F 4/65916* (2013.01)

(58) Field of Classification Search

CPC ............................... C08F 4/6592; C08F 4/659

See application file for complete search history.

(56) References Cited

U.S. PATENT DOCUMENTS

| | | | | |
|---|---|---|---|---|
| 4,935,474 A | | 6/1990 | Ewen | |
| 5,272,236 A | | 12/1993 | Lai | |
| 5,359,015 A | * | 10/1994 | Jejelowo | C08F 210/16 526/127 |
| 6,828,394 B2 | | 12/2004 | Vaughan | |
| 6,841,631 B2 | | 1/2005 | Loveday | |
| 6,894,128 B2 | | 5/2005 | Loveday | |
| 2007/0043248 A1 | | 2/2007 | Wu | |
| 2022/0169757 A1 | * | 6/2022 | Park | C07F 17/00 |

FOREIGN PATENT DOCUMENTS

| | | | | | |
|---|---|---|---|---|---|
| CN | 1300786 A | * | 6/2001 | C08F 10/00 |
| EP | 3925981 A1 | | 12/2021 | |
| JP | 2005120385 A | | 5/2005 | |
| JP | 2007197722 A | | 8/2007 | |
| JP | 2009501836 A | | 1/2009 | |
| JP | 2009543928 A | | 12/2009 | |
| JP | 4914894 B2 | | 4/2012 | |
| JP | 2015-113282 A | | 6/2015 | |
| KR | 101692346 B1 | | 1/2017 | |
| KR | 10-2019-0110961 A | | 10/2019 | |
| WO | 2018067289 A1 | | 4/2018 | |

OTHER PUBLICATIONS

CN-1300786-A (Jun. 27, 2001); machine translation. (Year: 2001).*

International Search Report dated Jun. 18, 2021.

Janiak, C. et al., "Analyses of propene and 1-hexene oligomers from zirconocene/MAO catalysts-mechanistic implications by NMR, SEC, and MALDI-TOF MS," Macromolecular Chemistry and Physics, 2002, vol. 203, No. 1, pp. 129-138.

Wigum, H. et al., "Ethene homopolymerization and copolymerization with 1-hexene for all methylsubstituted (RnC5H5-n)2ZrCI2/MAO catalytic systems: effects of split methyl substitution," Journal of Polymer Science: Part A: Polymer Chemistry, 2000, vol. 38, pp. 3161-3172.

An Office action issued on Oct. 31, 2023 for corresponding JP Patent Application.

KR NOA dated Apr. 12, 2023.

The European search report issued on Mar. 1, 2024.

* cited by examiner

*Primary Examiner* — Rip A Lee

(74) *Attorney, Agent, or Firm* — Harvest IP Law, LLP

(57) ABSTRACT

The present invention relates to a hybrid catalytic composition comprising different transition metal compounds, to a catalyst for olefin polymerization comprising the same, and to processes for preparing the same. Specifically, the present invention relates to a hybrid catalytic composition comprising different transition metal compounds capable of producing various polyolefins having excellent processability and mechanical properties, to a catalyst for olefin polymerization comprising the same, and processes for preparing the hybrid catalytic composition and the catalyst by adjusting the ratio of the transition metal compounds.

17 Claims, No Drawings

MIXED CATALYTIC COMPOSITION, CATALYST COMPRISING THE SAME, AND PROCESSES FOR PREPARING THE SAME

CROSS-REFERENCE TO RELATED APPLICATIONS

This application is a National Stage of International Application No. PCT/KR2021/002144 filed Feb. 19, 2021, claiming priority based on Korean Patent Application No. 10-2020-0023520 filed Feb. 26, 2020, the disclosure of which is incorporated herein by reference in its entirety.

TECHNICAL FIELD

The present invention relates to a hybrid catalytic composition comprising different transition metal compounds, to a catalyst for olefin polymerization comprising the same, and to processes for preparing the same. Specifically, the present invention relates to a hybrid catalytic composition comprising two or more types of transition metal compounds capable of producing various polyolefins having excellent processability and mechanical properties, to a catalyst for olefin polymerization comprising the same, and processes for preparing the hybrid catalytic composition and the catalyst.

BACKGROUND ART

Polyolefin-based polymers are widely used in real life as materials for shopping bags, greenhouses, fishing nets, cigarette packages, instant noodle packages, yogurt bottles, battery cases, automobile bumpers, interior parts, shoe soles, washing machines, and the like.

Conventionally, polyolefin-based polymers such as polyethylene, polypropylene, and ethylene-alpha olefin copolymers and their copolymers have been prepared using a heterogeneous catalyst such as a Ziegler-Natta catalyst made of a titanium compound and an alkyl aluminum compound.

In recent years, a method for preparing polyolefin using a metallocene catalyst, which is a homogeneous catalyst with a very high catalytic activity, has been studied. A metallocene catalyst is a compound in which a ligand such as cyclopentadienyl, indenyl, and cycloheptadienyl is coordinated to a transition metal or a transition metal halide compound. It has a sandwich structure in its basic form. Here, it has various molecular structures depending on the type of ligand and the type of core metal.

In a Ziegler-Natta catalyst as a heterogeneous catalyst, the metal component serving as the active sites is dispersed on an inert solid surface, whereby the properties of the active sites are not uniform. On the other hand, since a metallocene catalyst is a single compound having a specific structure, it is known as a single-site catalyst in which all active sites have the same polymerization characteristics.

In general, since a metallocene catalyst has no activity as a polymerization catalyst by itself, it is used together with a cocatalyst such as methyl aluminoxane. The metallocene catalyst is activated as a cation by the action of the cocatalyst. At the same time, the cocatalyst as an anion that is not coordinated with the metallocene catalyst stabilizes the unsaturated cationic active species to form a catalyst system having activity in the polymerization of various olefins.

Such a metallocene catalyst has advantages in that copolymerization is readily carried out, the three-dimensional structure of a polymer can be controlled according to the symmetry of the catalyst, and the polymer prepared thereby has a narrow molecular weight distribution with uniform distribution of a comonomer.

On the other hand, the polymers prepared by a metallocene catalyst has a shortcoming in that it has low processability despite excellent mechanical strength due to a narrow molecular weight distribution. In order to solve this problem, various methods such as changing the molecular structure of a polymer or broadening the molecular weight distribution thereof have been proposed. For example, U.S. Pat. No. 5,272,236 discloses a catalyst for introducing a long chain branch (LCB) as a side branch to the main chain of a polymer to improve the processability of the polymer; however, the supported catalyst has a disadvantage of low activity.

In order to solve this problem of a single metallocene catalyst and to develop a catalyst with excellent activity and improved processability in a convenient way, a method of hybrid supporting metallocene catalysts (different metallocene catalysts) having different properties is proposed. For example, U.S. Pat. Nos. 4,935,474, 6,828,394, and 6,894,128, Korean Patent No. 1437509, and U.S. Pat. No. 6,841,631 disclose a process for producing a polyolefin having a bimodal molecular weight distribution using catalysts having different reactivities for comonomers. Although the polyolefins having a bimodal molecular weight distribution prepared in this way have improved processability, they have lower homogeneity due to different molecular weight distributions. Thus, there is a problem in that it is difficult to obtain a product having uniform physical properties after processing, and the mechanical strength is deteriorated.

Meanwhile, Korean Patent No. 1797890 discloses a hybrid metallocene catalyst in which a first transition metal compound containing a cyclopentadienyl group and an indenyl group, which are not connected by a bridge, and a second transition metal compound containing a substituted bisindenyl group connected by a silyl bridge are mixed.

In addition, in order to solve the problem of a hybrid supported catalyst of different metallocene compounds, a method of using a heteronuclear metallocene catalyst having two active sites have been proposed. For example, Korean Laid-open Patent Publication No. 2004-0076965 discloses a method for controlling molecular weight distribution and molecular weight by using a binuclear metallocene catalyst on a carrier; however, there is a disadvantage of low activity.

DETAILED DESCRIPTION OF THE INVENTION

Technical Problem

An object of the present invention is to provide a hybrid catalytic composition comprising different transition metal compounds capable of producing various polyolefins having excellent processability and mechanical properties and a catalyst for olefin polymerization comprising the same.

Another object of the present invention is to provide a process for preparing a hybrid catalytic composition by adjusting the ratio of transition metal compounds and a process for preparing a catalyst for olefin polymerization comprising the same.

Technical Solution

According to an embodiment of the present invention for achieving the object, there is provided a hybrid catalytic composition comprising at least two kinds of the transition metal compounds represented by Formulae 1 to 3 and different from each other.

[Formula 1]

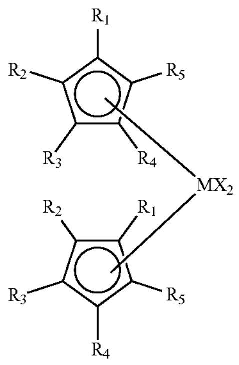

[Formula 2]

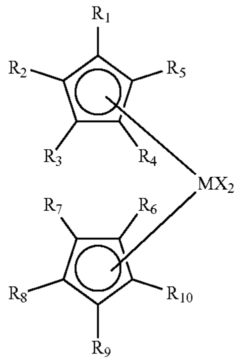

[Formula 3]

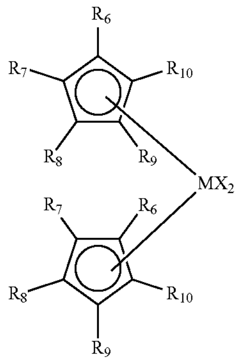

In Formulae 1 to 3, M is each titanium (Ti), zirconium (Zr), or hafnium (Hf),

X is each independently halogen, $C_{1-20}$ alkyl, $C_{2-20}$ alkenyl, $C_{2-20}$ alkynyl, $C_{6-20}$ aryl, $C_{1-20}$ alkyl $C_{6-20}$ aryl, $C_{6-20}$ aryl $C_{1-20}$ alkyl, $C_{1-20}$ alkylamido, or $C_{6-20}$ arylamido, $R_1$ to $R_5$ and $R_6$ to $R_{10}$ are each independently hydrogen, substituted or unsubstituted $C_{1-20}$ alkyl, substituted or unsubstituted $C_{2-20}$ alkenyl, substituted or unsubstituted $C_{6-20}$ aryl, substituted or unsubstituted $C_{1-20}$ alkyl $C_{6-20}$ aryl, substituted or unsubstituted $C_{6-20}$ aryl $C_{1-20}$ alkyl, substituted or unsubstituted $C_{1-20}$ heteroalkyl, substituted or unsubstituted $C_{3-20}$ heteroaryl, substituted or unsubstituted $C_{1-20}$ alkylamido, substituted or unsubstituted $C_{6-20}$ arylamido, or substituted or unsubstituted $C_{1-20}$ silyl, and $R_1$ to $R_5$ and $R_6$ to $R_{10}$ are each independently capable of being linked to adjacent groups to form a substituted or unsubstituted, saturated or unsaturated $C_{4-20}$ ring.

Specifically, in Formulae 1 to 3, M may be zirconium or hafnium, X may each be halogen or substituted or unsubstituted $C_{1-20}$ alkyl, $R_1$ to $R_5$ and $R_6$ to $R_{10}$ may each be hydrogen, substituted or unsubstituted $C_{1-20}$ alkyl, substituted or unsubstituted $C_{2-20}$ alkenyl, or substituted or unsubstituted $C_{6-20}$ aryl.

Preferably, the transition metal compound represented by Formula 1 is at least one of the transition metal compounds represented by Formulae 1-1 to 1-12, the transition metal compound represented by Formula 2 is at least one of the transition metal compounds represented by Formulae 2-1 to 2-12, and the transition metal compound represented by Formula 3 is at least one of the transition metal compounds represented by Formulae 3-1 to 3-12.

[Formula 1-1]

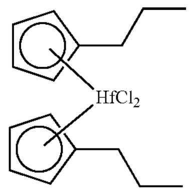

[Formula 1-2]

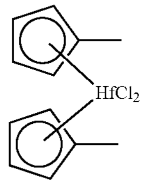

[Formula 1-3]

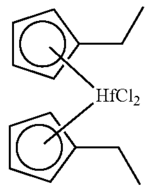

[Formula 1-4]

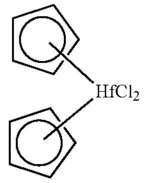

[Formula 1-5]

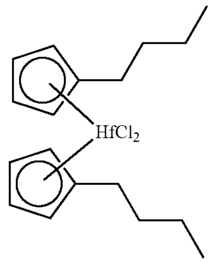

-continued
[Formula 1-6]
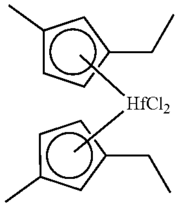
[Formula 1-7]
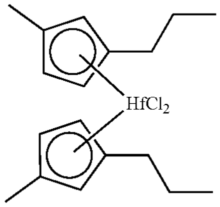
[Formula 1-8]
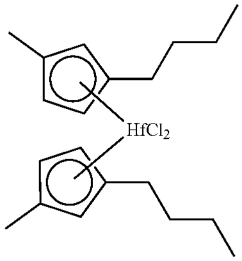
[Formula 1-9]
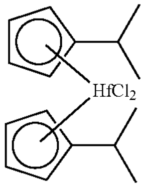
[Formula 1-10]
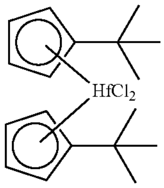
[Formula 1-11]
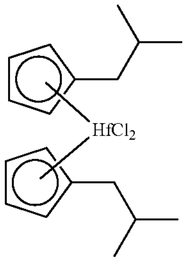
[Formula 1-12]
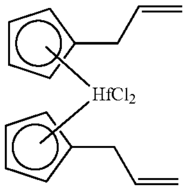
-continued
[Formula 2-1]
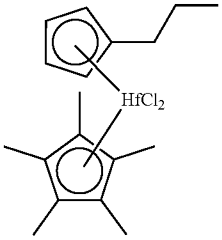
[Formula 2-2]
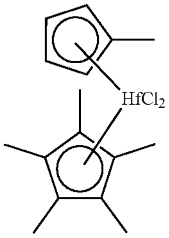
[Formula 2-3]
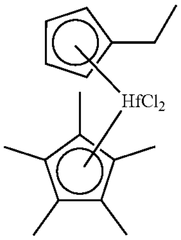
[Formula 2-4]
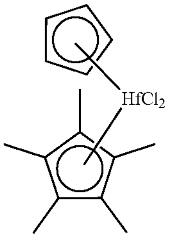
[Formula 2-5]
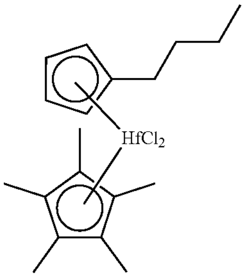
[Formula 2-6]
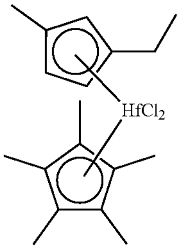

-continued
[Formula 2-7]
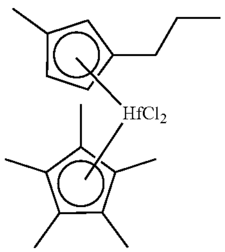
[Formula 2-8]
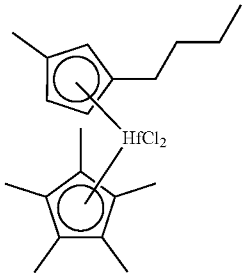
[Formula 2-9]
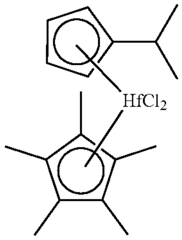
[Formula 2-10]
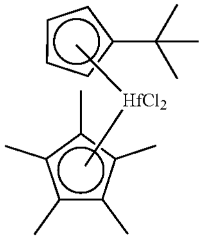
[Formula 2-11]
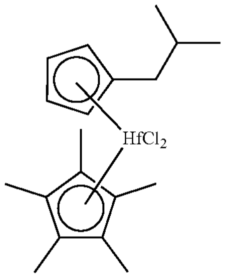
[Formula 2-12]
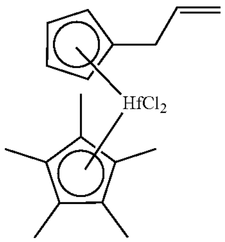
-continued
[Formula 3-1]
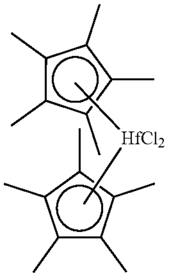
[Formula 3-2]
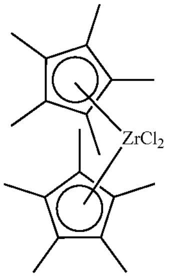
[Formula 3-3]
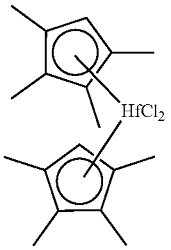
[Formula 3-4]
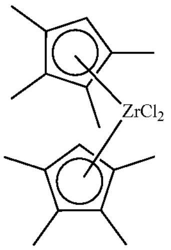
[Formula 3-5]
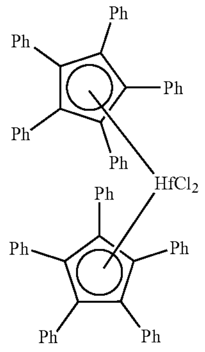

-continued

[Formula 3-6]

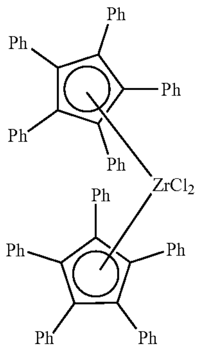

[Formula 3-7]

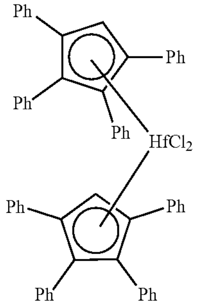

[Formula 3-8]

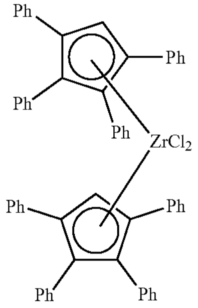

[Formula 3-9]

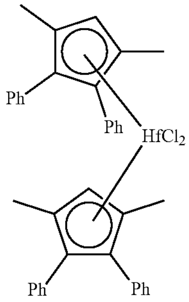

[Formula 3-10]

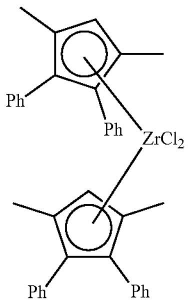

-continued

[Formula 3-11]

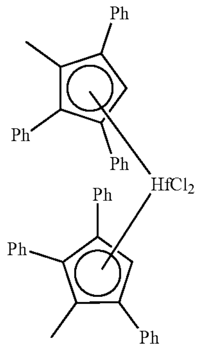

[Formula 3-12]

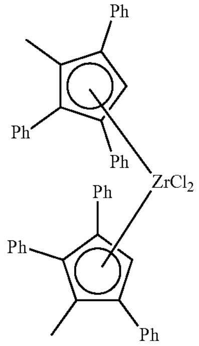

According to an embodiment of the present invention, there is provided a process for preparing a hybrid catalytic composition, which comprises (1) dissolving a compound represented by Formula 4 and a compound represented by Formula 5 in a solvent; and (2) adding a compound represented by Formula 6 to the solution obtained in step (1) and reacting it under stirring to obtain a hybrid catalytic composition comprising at least two kinds of the transition metal compounds represented by Formulae 1 to 3, wherein the molar ratio of the compound represented by Formula 4 to the compound represented by Formula 5 is in the range of 10:1 to 1:10.

[Formula 4]

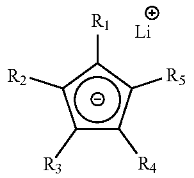

[Formula 5]

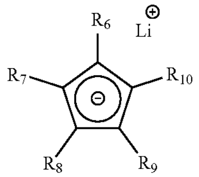

[Formula 6]

$MX_4$

In Formulae 4 to 6, M, X, $R_1$ to $R_5$, and $R_6$ to $R_{10}$ are as described above in the section of the hybrid catalytic composition.

Preferably, the compound represented by Formula 4 is at least one of the compounds represented by Formulae 4-1 to 4-12, and the compound represented by Formula 5 is at least one of the compounds represented by Formulae 5-1 to 5-6.

[Formula 4-1]

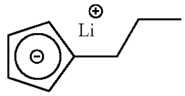

[Formula 4-2]

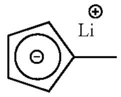

[Formula 4-3]

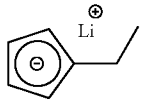

[Formula 4-4]

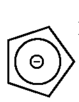

[Formula 4-5]

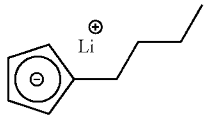

[Formula 4-6]

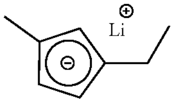

[Formula 4-7]

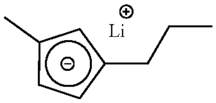

[Formula 4-8]

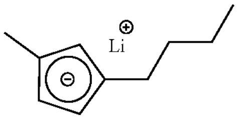

[Formula 4-9]

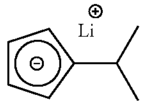

[Formula 4-10]

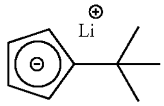

[Formula 4-11]

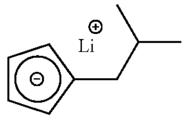

[Formula 4-12]

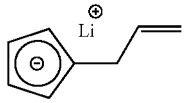

-continued

[Formula 5-1]

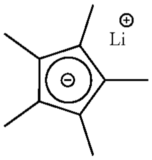

[Formula 5-2]

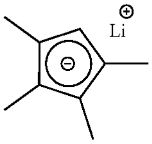

[Formula 5-3]

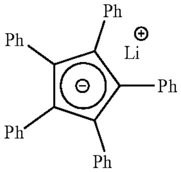

[Formula 5-4]

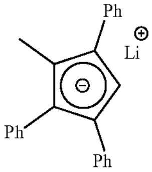

[Formula 5-5]

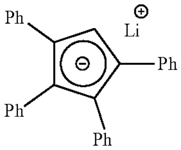

[Formula 5-6]

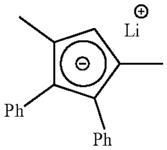

Preferably, the compound represented by Formula 6 is $ZrCl_4$ or $HfCl_4$.

Here, the solvent may comprise at least one selected from the group consisting of hexane, pentane, toluene, benzene, dichloromethane, diethyl ether, tetrahydrofuran, acetone, and ethyl acetate.

Preferably, the reaction temperature in step (2) is −30° C. to 120° C.

The process for preparing a hybrid catalytic composition according to an embodiment of the present invention may further comprise (2') drying the hybrid catalytic composition obtained in step (2).

In addition, the process for preparing a hybrid catalytic composition according to an embodiment of the present invention may further comprise (2") dissolving the dried hybrid catalytic composition obtained in step (2') in a solvent and then removing unreacted substances and/or impurities with a filter.

According to an embodiment for achieving another object of the present invention, there is provided a catalyst for olefin polymerization, which comprises a hybrid catalytic composition comprising at least two kinds of the transition metal compounds represented by Formulae 1 to 3; and a cocatalyst compound.

Here, the cocatalyst compound may be at least one selected from the group consisting of a compound represented by Formula 7, a compound represented by Formula 8, and a compound represented by Formula 9.

[Formula 7]

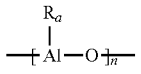

[Formula 8]

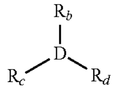

[Formula 9]

$[L\text{-}H]^+[Z(A)_4]^-$ or $[L]^+[Z(A)_4]^-$

In Formula 7, n is an integer of 2 or more, and $R_a$ may each independently be a halogen atom, $C_{1\text{-}20}$ hydrocarbon, or $C_{1\text{-}20}$ hydrocarbon substituted with halogen.

In Formula 8, D is aluminum (Al) or boron (B), and $R_b$, $R_c$, and $R_d$ are each independently a halogen atom, $C_{1\text{-}20}$ hydrocarbon, $C_{1\text{-}20}$ hydrocarbon substituted with halogen, or $C_{1\text{-}20}$ alkoxy.

In Formula 9, L is a neutral or cationic Lewis acid, $[L-H]^+$ and $[L]^+$ a Brönsted acid, Z is a group 13 element, and A is each independently substituted or unsubstituted $C_{6\text{-}20}$ aryl or substituted or unsubstituted $C_{1\text{-}20}$ alkyl.

Specifically, the compound represented by Formula 7 is at least one selected from the group consisting of methylaluminoxane, ethylaluminoxane, isobutylaluminoxane, and butylaluminoxane.

In addition, the compound represented by Formula 8 is at least one selected from the group consisting of trimethylaluminum, triethylaluminum, triisobutylaluminum, tripropylaluminum, tributylaluminum, dimethylchloroaluminum, triisopropylaluminum, tri-s-butylaluminum, tricyclopentylaluminum, tripentylaluminum, triisopentyaluminum, trihexyaluminum, trioctyaluminum, ethyldimethylaluminum, methyldiethylaluminum, triphenylaluminum, tri-p-tolylaluminum, dimethylaluminummethoxide, dimethylaluminumethoxide, trimethylboron, triethylboron, triisobutylboron, tripropylboron, and tributylboron.

In addition, the compound represented by Formula 9 is at least one selected from the group consisting of triethylammonium tetraphenylborate, tributylammonium tetraphenylborate, trimethylammonium tetraphenylborate, tripropylammonium tetraphenylborate, trimethylammonium tetra(p-tolyl)borate, trimethylammonium tetra(o,p-dimethylphenyl) borate, tributylammonium tetra(p-trifluoromethylphenyl) borate, trimethylammonium tetra(p-trifluoromethylphenyl) borate, tributylammonium tetrapentafluorophenylborate, N,N-diethylanilinium tetraphenylborate, N,N-diethylanilinium tetrapentafluorophenylborate, diethylammonium tetrapentafluorophenylborate, triphenylphosphonium tetraphenylborate, trimethylphosphonium tetraphenylborate, triethylammonium tetraphenylaluminate, tributylammonium tetraphenylaluminate, trimethylammonium tetraphenylaluminate, tripropylammonium tetraphenylaluminate, trimethylammonium tetra(p-tolyl)aluminate, tripropylammonium tetra(p-tolyl)aluminate, triethylammonium tetra(o,p-dimethylphenyl)aluminate, tributylammonium tetra(p-trifluoromethylphenyl)aluminate, trimethylammonium tetra(p-trifluoromethylphenyl)aluminate, tributylammonium tetrapentafluorophenylaluminate, N,N-diethylanilinium tetraphenylaluminate, N,N-diethylanilinium tetrapentafluorophenylaluminate, diethylammonium tetrapentatetraphenylaluminate, triphenylphosphonium tetraphenylaluminate, trimethylphosphonium tetraphenylaluminate, tripropylammonium tetra(p-tolyl)borate, triethylammonium tetra(o,p-dimethylphenyl)borate, tributylammonium tetra(p-trifluoromethylphenyl)borate, triphenylcarbonium tetra(p-trifluoromethylphenyl)borate, and triphenylcarbonium tetrapentafluorophenylborate.

Preferably, the catalyst for olefin polymerization further comprises a carrier for supporting the hybrid catalytic composition. Specifically, the carrier may support both of the hybrid catalytic composition and the cocatalyst.

Specifically, the carrier may comprise at least one selected from the group consisting of silica, alumina, and magnesia.

Here, the total amount of the hybrid transition metal compounds supported on the carrier is 0.001 to 1 mmole based on 1 g of the carrier, and the amount of the cocatalyst compound supported on the carrier is 2 to 15 mmoles based on the 1 g of the carrier.

According to another embodiment of the present invention, there is provided a process for preparing a catalyst for olefin polymerization, which comprises (1) dissolving a compound represented by Formula 4 and a compound represented by Formula 5 in a solvent; (2) adding a compound represented by Formula 6 to the solution obtained in step (1) and reacting it under stirring to obtain a hybrid catalytic composition comprising at least two kinds of the transition metal compounds represented by Formulae 1 to 3; and (3) supporting the hybrid catalytic composition obtained in step (2), a cocatalyst compound, or both on a carrier, wherein the molar ratio of the compound represented by Formula 4 to the compound represented by Formula 5 is in the range of 10:1 to 1:10.

Advantageous Effects of the Invention

In the hybrid catalytic composition comprising different transition metal compounds and the catalyst for olefin polymerization comprising the same according to embodiments of the present invention, it is possible to prepare polyolefins having excellent processability and mechanical properties depending on the content of the corresponding transition metal compounds.

In addition, in the processes for preparing a hybrid catalytic composition comprising different transition metal compounds and for preparing a catalyst for olefin polymerization comprising the same, it is possible to easily provide a catalyst for polymerization of polyolefins having excellent processability and mechanical properties by precisely controlling the ratio of the hybrid transition metal compounds.

BEST MODE FOR CARRYING OUT THE INVENTION

Hereinafter, the present invention will be described in more detail.

Hybrid Catalytic Composition Comprising Different Transition Metal Compounds According to an embodiment of the present invention, there is provided a hybrid catalytic composition comprising at least two kinds of the transition metal compounds represented by Formulae 1 to 3 and different from each other.

[Formula 1]

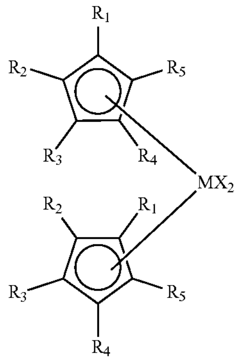

[Formula 2]

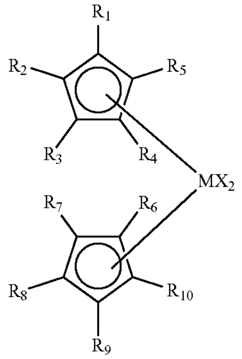

[Formula 3]

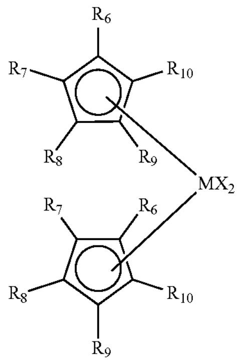

In Formulae 1 to 3, M is titanium (Ti), zirconium (Zr), or hafnium (Hf). Specifically, M may be zirconium or hafnium.

X is each independently halogen, $C_{1-20}$ alkyl, $C_{2-20}$ alkenyl, $C_{2-20}$ alkynyl, $C_{6-20}$ aryl, $C_{1-20}$ alkyl $C_{6-20}$ aryl, $C_{6-20}$ aryl $C_{1-20}$ alkyl, $C_{1-20}$ alkylamido, or $C_{6-20}$ arylamido. Specifically, X may each be halogen or substituted or unsubstituted $C_{1-20}$ alkyl. More specifically, X may each be chlorine.

$R_1$ to $R_5$ and $R_6$ to $R_{10}$ are each independently hydrogen, substituted or unsubstituted $C_{1-20}$ alkyl, substituted or unsubstituted $C_{2-20}$ alkenyl, substituted or unsubstituted $C_{6-20}$ aryl, substituted or unsubstituted $C_{1-20}$ alkyl $C_{6-20}$ aryl, substituted or unsubstituted $C_{6-20}$ aryl $C_{1-20}$ alkyl, substituted or unsubstituted $C_{1-20}$ heteroalkyl, substituted or unsubstituted $C_{3-20}$ heteroaryl, substituted or unsubstituted $C_{1-20}$ alkylamido, substituted or unsubstituted $C_{6-20}$ arylamido, or substituted or unsubstituted $C_{1-20}$ silyl. Here, $R_1$ to $R_5$ and $R_6$ to $R_{10}$ are each independently capable of being linked to adjacent groups to form a substituted or unsubstituted saturated or unsaturated $C_{4-20}$ ring. Specifically, $R_1$ to $R_5$ and $R_6$ to $R_{10}$ may each be hydrogen, substituted or unsubstituted $C_{1-20}$ alkyl, substituted or unsubstituted $C_{2-20}$ alkenyl, or substituted or unsubstituted $C_{6-20}$ aryl.

In a preferred specific embodiment of the present invention, in Formulae 1 to 3, M may be zirconium or hafnium, X may each be halogen or substituted or unsubstituted $C_{1-20}$ alkyl, $R_1$ to $R_5$ and $R_6$ to $R_{10}$ may each be hydrogen, substituted or unsubstituted $C_{1-20}$ alkyl, substituted or unsubstituted $C_{2-20}$ alkenyl, or substituted or unsubstituted $C_{6-20}$ aryl.

In a more preferred embodiment of the present invention, the transition metal compound represented by Formula 1 may be at least one of the transition metal compounds represented by Formulae 1-1 to 1-12, the transition metal compound represented by Formula 2 may be at least one of the transition metal compounds represented by Formulae 2-1 to 2-12, and the transition metal compound represented by Formula 3 may be at least one of the transition metal compounds represented by Formulae 3-1 to 3-12.

[Formula 1-1]

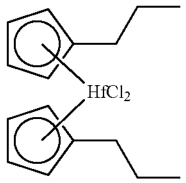

[Formula 1-2]

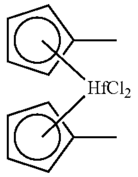

[Formula 1-3]

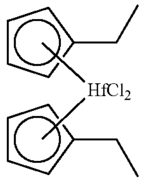

[Formula 1-4]

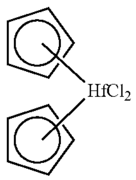

[Formula 1-5]

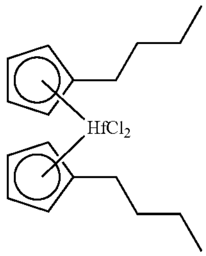

[Formula 1-6]

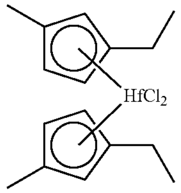

-continued
[Formula 1-7]
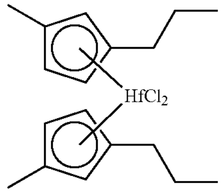
[Formula 1-8]
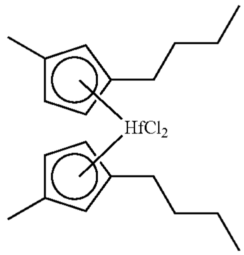
[Formula 1-9]
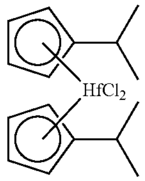
[Formula 1-10]
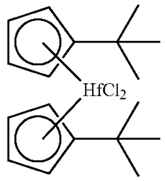
[Formula 1-11]
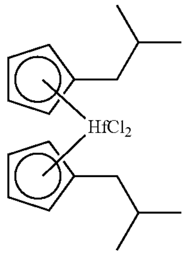
[Formula 1-12]
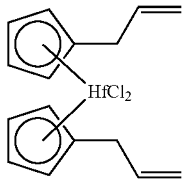
[Formula 2-1]
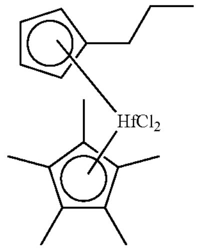
-continued
[Formula 2-2]
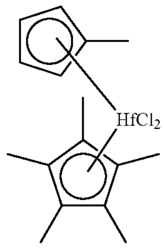
[Formula 2-3]
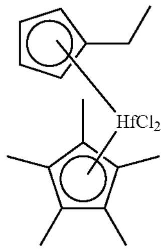
[Formula 2-4]
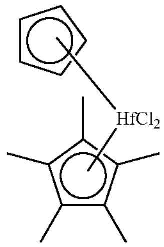
[Formula 2-5]
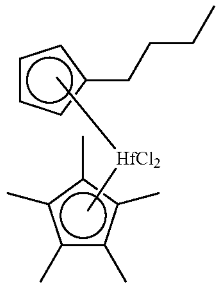
[Formula 2-6]
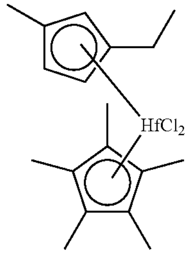
[Formula 2-7]
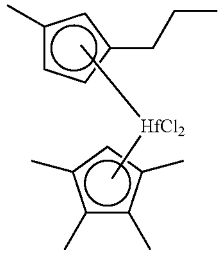

-continued
[Formula 2-8]
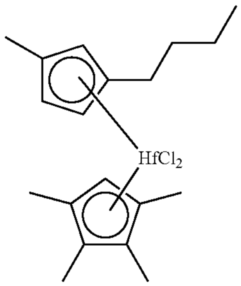
[Formula 2-9]
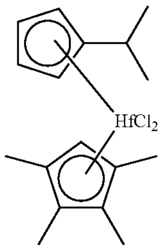
[Formula 2-10]
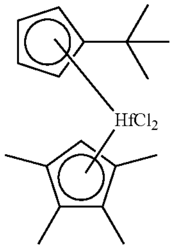
[Formula 2-11]
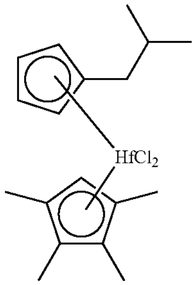
[Formula 2-12]
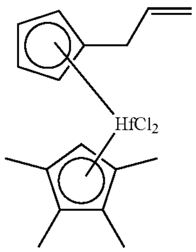
-continued
[Formula 3-1]
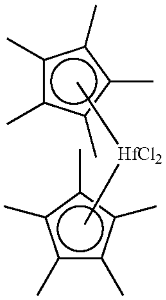
[Formula 3-2]
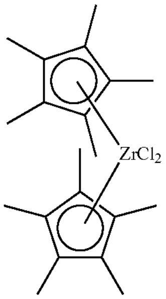
[Formula 3-3]
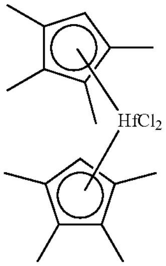
[Formula 3-4]
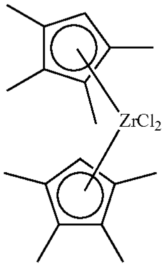
[Formula 3-5]
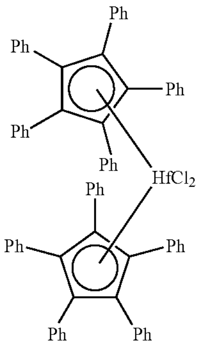

-continued

[Formula 3-6]

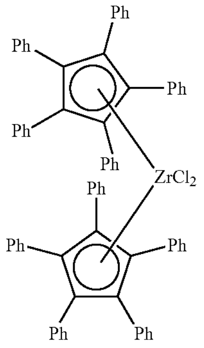

[Formula 3-7]

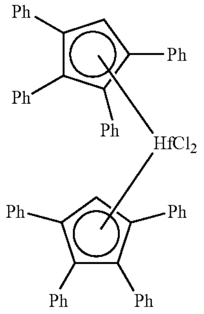

[Formula 3-8]

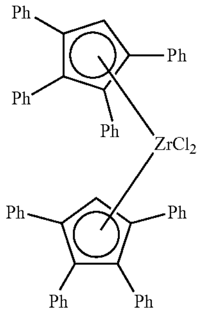

[Formula 3-9]

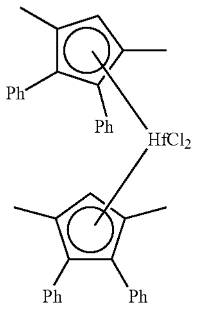

[Formula 3-10]

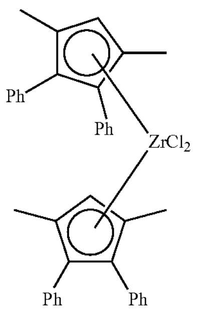

-continued

[Formula 3-11]

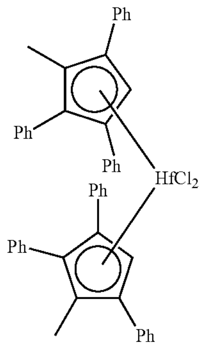

[Formula 3-12]

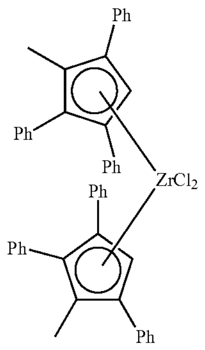

Process for Preparing a Hybrid Catalytic Composition

According to an embodiment of the present invention, there is provided a process for preparing a hybrid catalytic composition, which comprises (1) dissolving a compound represented by Formula 4 and a compound represented by Formula 5 in a solvent; and (2) adding a compound represented by Formula 6 to the solution obtained in step (1) and reacting it under stirring to obtain a hybrid catalytic composition comprising at least two kinds of the transition metal compounds represented by Formulae 1 to 3, wherein the molar ratio of the compound represented by Formula 4 to the compound represented by Formula 5 is in the range of 10:1 to 1:10.

[Formula 4]

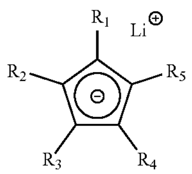

[Formula 5]

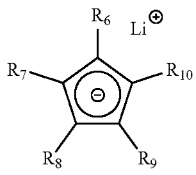

[Formula 6]

$MX_4$

In Formulae 4 to 6, M, X, $R_1$ to $R_5$, and $R_6$ to $R_{10}$ are as described above in the section of the hybrid catalytic composition.

Specifically, in step (1), the compound represented by Formula 4 and the compound represented by Formula 5 are dissolved in a solvent.

Preferably, the compound represented by Formula 4 is at least one of the compounds represented by Formulae 4-1 to 4-12, and the compound represented by Formula 5 is at least one of the compounds represented by Formulae 5-1 to 5-6.

[Formula 4-1]

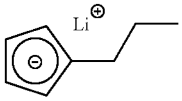

[Formula 4-2]

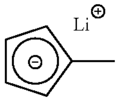

[Formula 4-3]

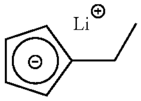

[Formula 4-4]

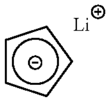

[Formula 4-5]

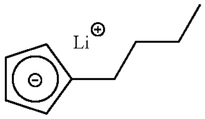

[Formula 4-6]

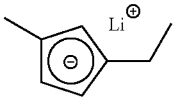

[Formula 4-7]

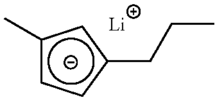

[Formula 4-8]

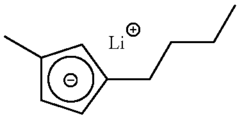

[Formula 4-9]

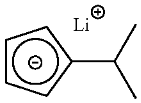

[Formula 4-10]

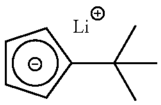

[Formula 4-11]

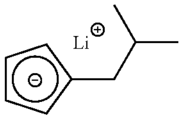

[Formula 4-12]

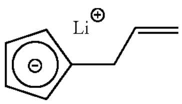

-continued

[Formula 5-1]

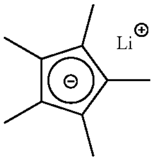

[Formula 5-2]

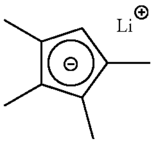

[Formula 5-3]

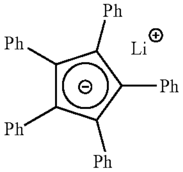

[Formula 5-4]

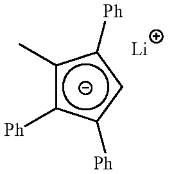

[Formula 5-5]

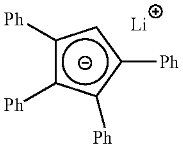

[Formula 5-6]

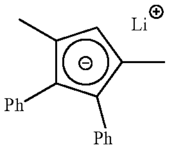

In addition, the solvent may comprise at least one selected from the group consisting of aliphatic hydrocarbon solvents such as hexane and pentane, aromatic hydrocarbon solvents such as toluene and benzene, hydrocarbon solvents substituted with chlorine atoms such as dichloromethane, ether-based solvents such as diethyl ether and tetrahydrofuran, acetone, and ethyl acetate. Preferably, the solvent may be toluene, but it is not particularly limited thereto.

When the compound represented by Formula 4 and the compound represented by Formula 5 are dissolved in a solvent, the order in which the respective compounds are added is not particularly limited. That is, the compound represented by Formula 4 may be added to a solvent to be dissolved, followed by the addition of the compound represented by Formula 5 to the solvent to be dissolved, or vice versa. In addition, these two compounds may be simultaneously added to a solvent to be dissolved.

When the compound represented by Formula 4 and the compound represented by Formula 5 are dissolved in a solvent, the temperature and dissolution time are not particularly limited. For example, the compound represented by Formula 4 and the compound represented by Formula 5 are added to a solvent, respectively or simultaneously, at a temperature of −78° C. to 30° C., preferably a temperature of −40° C. to 10° C., more preferably a temperature of about −30° C. and stirred to be dissolved for 1 to 24 hours, preferably 5 to 20 hours, more preferably about 15 hours.

In step (1), the molar ratio of the compound represented by Formula 4 to the compound represented by Formula 5 to be dissolved in a solvent is in the range of 10:1 to 1:10. Preferably, the molar ratio of these two compounds is 5:1 to 1:5. More preferably, the molar ratio of these two compounds is 3:1 to 1:3.

In step (2), a compound represented by Formula 6 is added to the solution obtained in step (1), which is reacted under stirring to obtain a hybrid catalytic composition comprising at least two kinds of the transition metal compounds represented by Formulae 1 to 3. Preferably, the compound represented by Formula 6 is $ZrCl_4$ or $HfCl_4$.

The temperature at which the compound represented by Formula 6 is added is preferably in the range of −78° C. to 30° C. More preferably, the temperature at which the compound represented by Formula 6 is added may be in the range of −40° C. to 30° C. Most preferably, the temperature at which the compound represented by Formula 6 is added may be room temperature.

Once the compound represented by Formula 6 has been added, the temperature is gradually raised to a range of −30° C. to 120° C., more preferably 0° C. to 100° C., and most preferably room temperature to 100° C., and it is stirred for 1 to 24 hours, preferably 5 to 20 hours, and more preferably about 17 hours to carry out the reaction.

The process for preparing a hybrid catalytic composition according to another embodiment of the present invention may further comprise (2') drying the hybrid catalytic composition obtained in step (2). Here, the drying conditions of the composition are not particularly limited, but it may be carried out in a temperature range of 25° C. to 80° C., more preferably in a temperature range of 25° C. to 50° C., and most preferably at a temperature of about 25° C.

In addition, the process for preparing a hybrid catalytic composition according to another embodiment of the present invention may further comprise (2") dissolving the dried hybrid catalytic composition obtained in step (2') in a solvent and then removing unreacted substances and/or impurities with a filter. Here, the solvent may be substantially the same as the solvent used in step (1) above. Preferably, dichloromethane may be used, but it is not particularly limited thereto. The filter for removing unreacted substances and/or impurities is not particularly limited, but a Celite filter is preferably used.

Catalyst for Olefin Polymerization

According to another embodiment of the present invention, there is provided a catalyst for olefin polymerization, which comprises a hybrid catalytic composition comprising at least two kinds of the transition metal compounds represented by Formulae 1 to 3 and different from each other; and a cocatalyst compound.

[Formula 1]

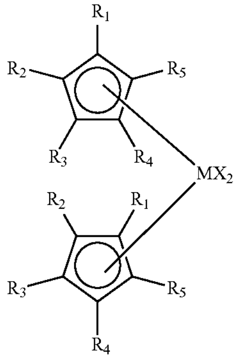

[Formula 2]

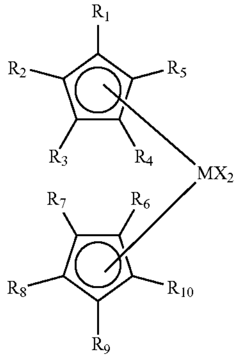

[Formula 3]

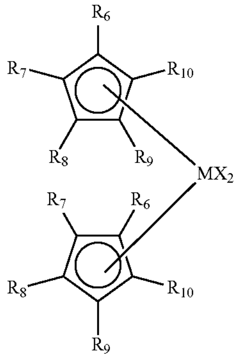

In Formulae 1 to 3, M, X, $R_1$ to $R_5$, and $R_6$ to $R_{10}$ are as described above in the section of the hybrid catalytic composition.

In a preferred embodiment of the present invention, the transition metal compound represented by Formula 1 may be at least one of the transition metal compounds represented by Formulae 1-1 to 1-12, the transition metal compound represented by Formula 2 may be at least one of the transition metal compounds represented by Formulae 2-1 to 2-12, and the transition metal compound represented by Formula 3 may be at least one of the transition metal compounds represented by Formulae 3-1 to 3-12.

-continued
[Formula 1-1]
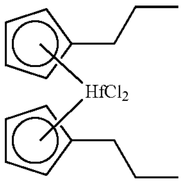
[Formula 1-2]
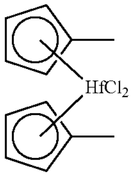
[Formula 1-3]
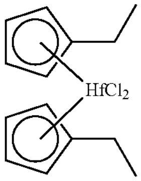
[Formula 1-4]
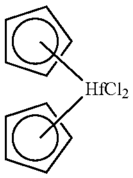
[Formula 1-5]
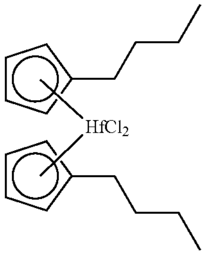
[Formula 1-6]
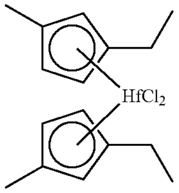
[Formula 1-7]
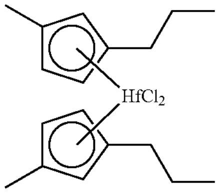
[Formula 1-8]
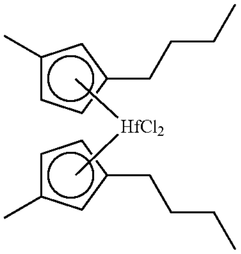
[Formula 1-9]
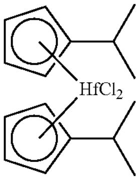
[Formula 1-10]
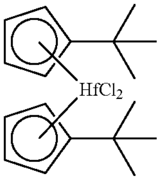
[Formula 1-11]
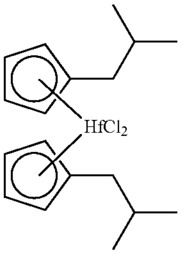
[Formula 1-12]
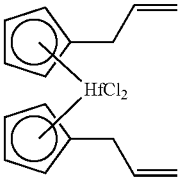
[Formula 2-1]
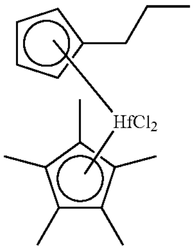
[Formula 2-2]
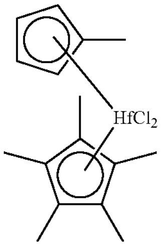

-continued
[Formula 2-3]
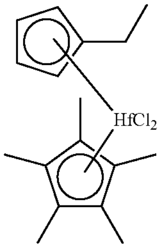
[Formula 2-4]
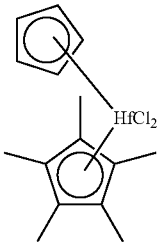
[Formula 2-5]
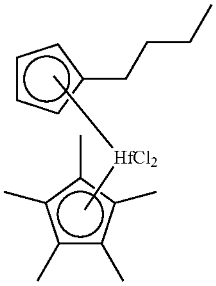
[Formula 2-6]
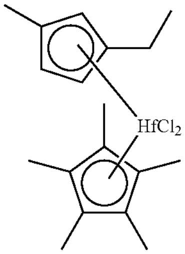
[Formula 2-7]
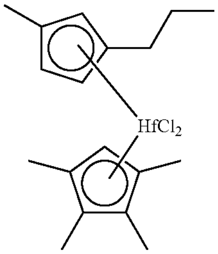
[Formula 2-8]
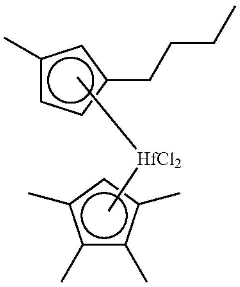
-continued
[Formula 2-9]
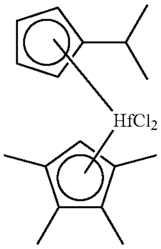
[Formula 2-10]
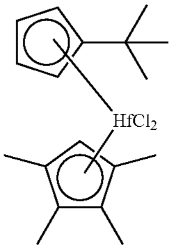
[Formula 2-11]
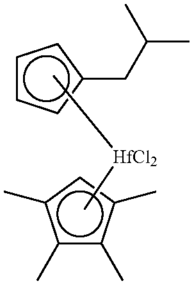
[Formula 2-12]
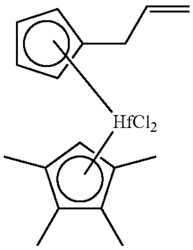
[Formula 3-1]
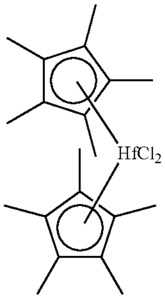

-continued
[Formula 3-2]
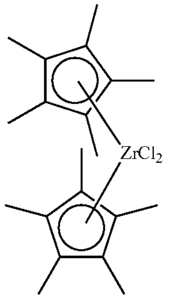
[Formula 3-3]
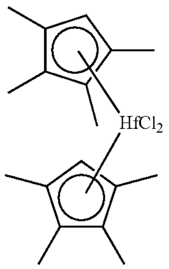
[Formula 3-4]
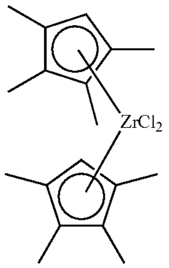
[Formula 3-5]
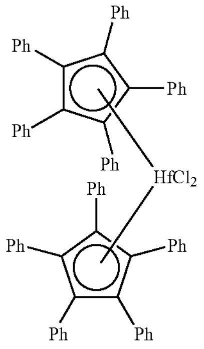
[Formula 3-6]
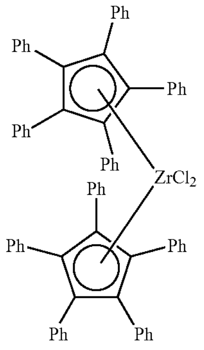
-continued
[Formula 3-7]
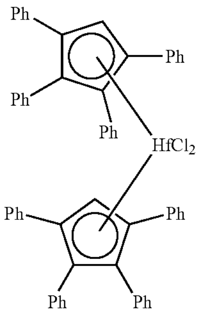
[Formula 3-8]
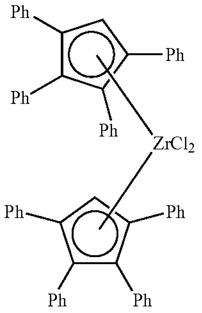
[Formula 3-9]
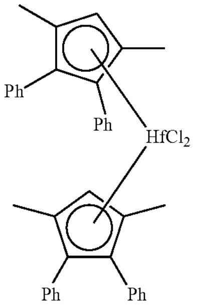
[Formula 3-10]
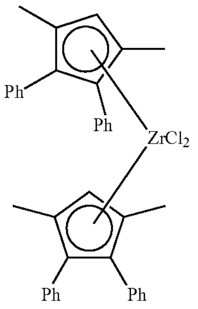
[Formula 3-11]
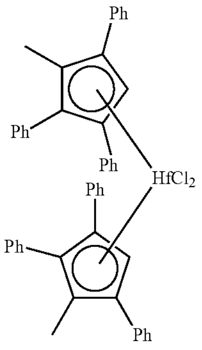

-continued

[Formula 3-12]

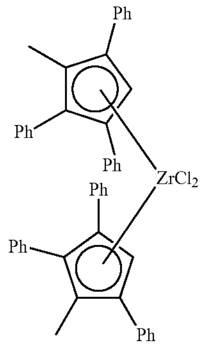

Meanwhile, the cocatalyst compound may comprise at least one of a compound represented by Formula 7, a compound represented by Formula 8, and a compound represented by Formula 9.

[Formula 7]

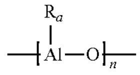

In Formula 7, n is an integer of 2 or more, and $R_a$ may each independently be halogen, $C_{1-20}$ hydrocarbon, or $C_{1-20}$ hydrocarbon substituted with halogen. Specifically, $R_a$ may be methyl, ethyl, n-butyl, or isobutyl.

[Formula 8]

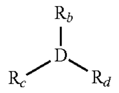

In Formula 8, D is aluminum (Al) or boron (B), and $R_b$, $R_c$, and $R_d$ are each independently a halogen atom, $C_{1-20}$ hydrocarbon, $C_{1-20}$ hydrocarbon substituted with halogen, or $C_{1-20}$ alkoxy. Specifically, when D is aluminum (Al), $R_b$, $R_c$, and $R_d$ may each independently be methyl or isobutyl, and when D is boron (B), $R_b$, $R_c$, and $R_d$ may each be pentafluorophenyl.

$$[L-H]^+[Z(A)_4]^- \text{ or } [L]^+[Z(A)_4]^- \qquad \text{[Formula 9]}$$

In Formula 9, L is a neutral or cationic Lewis acid, $[L-H]^+$ and $[L]^+$ a Brönsted acid, Z is a group 13 element, and A is each independently substituted or unsubstituted $C_{6-20}$ aryl or substituted or unsubstituted $C_{1-20}$ alkyl. Specifically, $[LH]^+$ may be a dimethylanilinium cation, $[Z(A)_4]^-$ may be $[B(C_6F_5)_4]^-$, and $[L]^+$ may be $[(C_6H_5)_3C]^+$.

Specifically, examples of the compound represented by Formula 7 include methylaluminoxane, ethylaluminoxane, isobutylaluminoxane, butylaluminoxane, and the like. Preferred is methylaluminoxane. But it is not limited thereto.

Examples of the compound represented by Formula 8 include trimethylaluminum, triethylaluminum, triisobutylaluminum, tripropylaluminum, tributylaluminum, dimethylchloroaluminum, triisopropylaluminum, tri-s-butylaluminum, tricyclopentylaluminum, tripentylaluminum, triisopentyaluminum, trihexyaluminum, trioctyaluminum, ethyldimethylaluminum, methyldiethylaluminum, triphenylaluminum, tri-p-tolylaluminum, dimethylaluminummethoxide, dimethylaluminumethoxide, trimethylboron, triethylboron, triisobutylboron, tripropylboron, and tributylboron. Preferred are trimethylaluminum, triethylaluminum, and triisobutylaluminum. But it is not limited thereto.

Examples of the compound represented by Formula 9 include triethylammonium tetraphenylborate, tributylammonium tetraphenylborate, trimethylammonium tetraphenylborate, tripropylammonium tetraphenylborate, trimethylammonium tetra(p-tolyl)borate, trimethylammonium tetra (o,p-dimethylphenyl)borate, tributylammonium tetra(p-trifluoromethylphenyl)borate, trimethylammonium tetra(p-trifluoromethylphenyl)borate, tributylammonium tetrapentafluorophenylborate, N,N-diethylanilinium tetraphenylborate, N,N-diethylanilinium tetrapentafluorophenylborate, diethylammonium tetrapentafluorophenylborate, triphenylphosphonium tetraphenylborate, trimethylphosphonium tetraphenylborate, triethylammonium tetraphenylaluminate, tributylammonium tetraphenylaluminate, trimethylammonium tetraphenylaluminate, tripropylammonium tetraphenylaluminate, trimethylammonium tetra(p-tolyl)aluminate, tripropylammonium tetra(p-tolyl)aluminate, triethylammonium tetra(o,p-dimethylphenyl)aluminate, tributylammonium tetra(p-trifluoromethylphenyl)aluminate, trimethylammonium tetra (p-trifluoromethylphenyl)aluminate, tributylammonium tetrapentafluorophenylaluminate, N,N-diethylanilinium tetraphenylaluminate, N,N-diethylanilinium tetrapentafluorophenylaluminate, diethylammonium tetrapentatetraphenylaluminate, triphenylphosphonium tetraphenylaluminate, trimethylphosphonium tetraphenylaluminate, tripropylammonium tetra(p-tolyl)borate, triethylammonium tetra(o,p-dimethylphenyl)borate, tributylammonium tetra(p-trifluoromethylphenyl)borate, triphenylcarbonium tetra(p-trifluoromethylphenyl)borate, and triphenylcarbonium tetrapentafluorophenylborate.

In a preferred embodiment of the present invention, the catalyst for olefin polymerization may further comprise a carrier for supporting the hybrid catalytic composition. Specifically, the carrier may support both of the hybrid catalytic composition and the cocatalyst.

In such an event, the carrier may comprise a material containing a hydroxyl group on its surface. Preferably, a material that has been dried to remove moisture from its surface and has a highly reactive hydroxyl group and a siloxane group may be used. For example, the carrier may comprise at least one selected from the group consisting of silica, alumina, and magnesia. Specifically, silica, silica-alumina, and silica-magnesia dried at high temperatures may be used as a carrier. They usually contain oxides, carbonates, sulfates, and nitrates components such as $Na_2O$, $K_2CO_3$, $BaSO_4$, and $Mg(NO_3)_2$. In addition, they may comprise carbon, zeolite, magnesium chloride, and the like. However, the carrier is not limited thereto. It is not particularly limited as long as it can support the transition metal compound and the cocatalyst compound.

The carrier may have an average particle size of 10 to 250 μm, preferably an average particle size of 10 to 150 μm, and more preferably 20 to 100 μm.

The carrier may have a micropore volume of 0.1 to 10 cc/g, preferably 0.5 to 5 cc/g, and more preferably 1.0 to 3.0 cc/g.

The carrier may have a specific surface area of 1 to 1,000 $m^2/g$, preferably 100 to 800 $m^2/g$, more preferably 200 to 600 $m^2/g$.

In a preferred example, when the carrier is silica, the drying temperature of the silica may be from room temperature to 900° C. The drying temperature may preferably be from room temperature to 800° C., more preferably from room temperature to 700° C. If the drying temperature is lower than room temperature, there would be too much moisture so that the moisture on the surface and the cocatalyst may react. If it exceeds 900° C., the structure of the carrier may collapse.

The dried silica may have a concentration of hydroxy groups of 0.1 to 5 mmoles/g, preferably 0.7 to 4 mmoles/g, and more preferably 1.0 to 2 mmoles/g. If the concentration of hydroxy groups is less than 0.1 mmole/g, the amount of supported cocatalyst may be low. If it exceeds 5 mmole/g, there may arise a problem that the catalyst component may be deactivated.

The total amount of the hybrid transition metal compounds supported on a carrier may be 0.001 to 1 mmole based on 1 g of the carrier. When the content ratio of the hybrid transition metal compounds and the carrier satisfies the above range, an appropriate level of activity of the supported catalyst may be exhibited, which is advantageous from the viewpoint of maintaining the activity of the catalyst and economical efficiency.

The amount of the cocatalyst compound supported on a carrier may be 2 to 15 mmoles based on the 1 g of the carrier. When the content ratio of the cocatalyst compound and the carrier satisfies the above range, it is advantageous from the viewpoint of maintaining the activity of the catalyst and economical efficiency.

One or two or more types of a carrier may be used. For example, both the hybrid catalytic composition and the cocatalyst compound may be supported on one type of a carrier, or the hybrid catalytic composition and the cocatalyst compound may be supported on two or more types of a carrier, respectively. In addition, either one of the hybrid catalytic composition and the cocatalyst compound may be supported on a carrier.

Process for Preparing a Catalyst for Olefin Polymerization

According to another embodiment of the present invention, there is provided a process for preparing a catalyst for olefin polymerization, which comprises (1) dissolving a compound represented by Formula 4 and a compound represented by Formula 5 in a solvent; (2) adding a compound represented by Formula 6 to the solution obtained in step (1) and reacting it under stirring to obtain a hybrid catalytic composition comprising at least two kinds of the transition metal compounds represented by Formulae 1 to 3; and (3) supporting the hybrid catalytic composition obtained in step (2), a cocatalyst compound, or both on a carrier, wherein the molar ratio of the compound represented by Formula 4 to the compound represented by Formula 5 is in the range of 10:1 to 1:10.

[Formula 1]

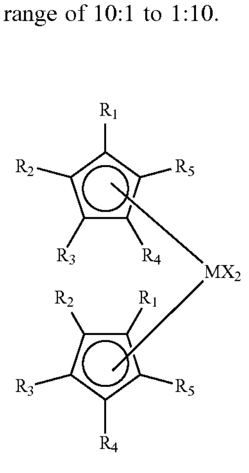

-continued

[Formula 2]

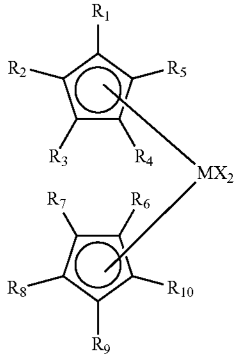

[Formula 3]

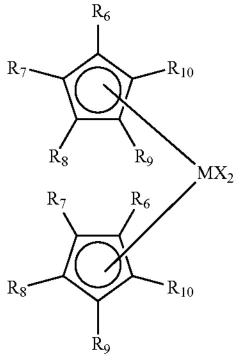

[Formula 4]

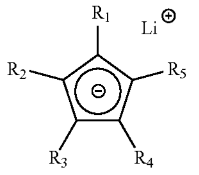

[Formula 5]

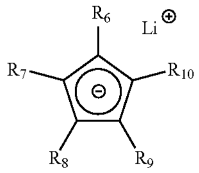

[Formula 6]

$MX_4$

In Formulae 1 to 6, M, X, $R_1$ to $R_5$, and $R_6$ to $R_{10}$ are as described above in the section of the hybrid catalytic composition.

Details of steps (1) and (2) are substantially the same as steps (1) and (2) of the process for preparing a hybrid catalytic composition described above.

The process for preparing a catalyst for olefin polymerization according to another embodiment of the present invention may further comprise (2') drying the composition obtained in step (2). Here, details of step (2') are substantially the same as step (2') of the process for preparing a hybrid catalytic composition described above.

In addition, the process for preparing a catalyst for olefin polymerization according to another embodiment of the present invention may further comprise (2") dissolving the dried composition obtained in step (2') in a solvent and then removing unreacted substances and/or impurities with a filter. Here, details of step (2") are substantially the same as step (2") of the process for preparing a hybrid catalytic composition described above.

In step (3), the hybrid catalytic composition, a cocatalyst compound, or both are supported on a carrier.

As a method of supporting the hybrid catalytic composition and/or the cocatalyst compound employed in a catalyst for olefin polymerization on the carrier, a physical adsorption method or a chemical adsorption method may be used.

For example, the physical adsorption method may be a method of contacting a solution in which the hybrid catalytic composition has been dissolved with a carrier and then drying the same; a method of contacting a solution in which the hybrid catalytic composition and a cocatalyst compound have been dissolved with a carrier and then drying the same; or a method of contacting a solution in which the hybrid catalytic composition has been dissolved with a carrier and then drying the same to prepare the carrier that supports the hybrid catalytic composition, separately contacting a solution in which a cocatalyst compound has been dissolved with a carrier and then drying the same to prepare the carrier that supports the cocatalyst compound, and then mixing them.

The chemical adsorption method may be a method of supporting a cocatalyst compound on the surface of a carrier, and then supporting the hybrid catalytic composition on the cocatalyst compound; or a method of covalently bonding a functional group on the surface of a carrier (e.g., a hydroxy group (—OH) on the silica surface in the case of silica) with the hybrid transition metal compounds.

Here, the solvent used in supporting the hybrid catalytic composition and/or the cocatalyst compound is not particularly limited. For example, the solvent may comprise at least one selected from the group consisting of aliphatic hydrocarbon solvents such as hexane and pentane, aromatic hydrocarbon solvents such as toluene and benzene, hydrocarbon solvents substituted with chlorine atoms such as dichloromethane, ether-based solvents such as diethyl ether and tetrahydrofuran, acetone, and ethyl acetate.

In a preferred embodiment, the procedure in which the hybrid catalytic composition and/or the cocatalyst compound are supported on the carrier in step (3) may be carried out at a temperature of 0 to 100° C., preferably at a temperature from room temperature to 90° C.

In addition, the procedure in which the hybrid catalytic composition and/or the cocatalyst compound are supported on the carrier in step (3) may be carried out as a mixture of the hybrid catalytic composition and/or the cocatalyst compound and the carrier is sufficiently stirred for 1 minute to 24 hours, preferably 5 minutes to 15 hours.

Polymerization of Olefin

An olefinic monomer may be polymerized in the presence of the catalyst for olefin polymerization according to an embodiment of the present invention to prepare a polyolefin.

Here, the polyolefin may be a homopolymer of an olefinic monomer or a copolymer of an olefinic monomer and an olefinic comonomer.

The olefinic monomer is at least one selected from the group consisting of a $C_{2-20}$ alpha-olefin, a $C_{1-20}$ diolefin, a $C_{3-20}$ cycloolefin, and a $C_{3-20}$ cyclodiolefin.

For example, the olefinic monomer may be ethylene, propylene, 1-butene, 1-pentene, 4-methyl-1-pentene, 1-hexene, 1-heptene, 1-octene, 1-decene, 1-undecene, 1-dodecene, 1-tetradecene, 1-hexadecene, or the like, and the polyolefin may be a homopolymer comprising only one olefinic monomer or a copolymer comprising two or more olefinic monomers exemplified above.

As an exemplary example, the polyolefin may be a copolymer in which ethylene and a $C_{3-20}$ alpha-olefin are copolymerized. Preferred is a copolymer in which ethylene and 1-hexene are copolymerized. But it is not limited thereto.

In such an event, the content of ethylene is preferably 55 to 99.9% by weight, more preferably 90 to 99.9% by weight. The content of the alpha-olefinic comonomer is preferably 0.1 to 45% by weight, more preferably 0.1 to 10% by weight.

The polyolefin according to an embodiment of the present invention may be prepared by a polymerization reaction such as free radical, cationic, coordination, condensation, and addition, but it is not limited thereto.

As a preferred example, the polyolefin may be prepared by a gas phase polymerization method, a solution polymerization method, a slurry polymerization method, or the like. When the polyolefin is prepared by a solution polymerization method or a slurry polymerization method, examples of a solvent that may be used include $C_{5-12}$ aliphatic hydrocarbon solvents such as pentane, hexane, heptane, nonane, decane, and isomers thereof; aromatic hydrocarbon solvents such as toluene and benzene; hydrocarbon solvents substituted with chlorine atoms such as dichloromethane and chlorobenzene; and mixtures thereof, but it is not limited thereto.

EMBODIMENTS FOR CARRYING OUT THE INVENTION

Example

Hereinafter, the present invention will be described in detail with reference to Examples. However, the following examples are intended to further illustrate the present invention. The scope of the present invention is not limited thereto only.

Example 1

24 mg (0.10 mmole, 2 eq.) of lithium n-propylcyclopentadienide of Formula 4-1 and 15 mg (0.21 mmole, 1 eq.) of lithium pentamethylcyclopentadienide of Formula 5-1 were dissolved in 10 ml of toluene at −30° C. 50 mg (0.16 mmole, 1.5 eq.) of hafnium chloride ($HfCl_4$) was added to this solution at room temperature. It was then stirred at 60° C. for 17 hours. The reaction product was dried, dissolved in a dichloromethane solvent, and filtered through a Celite filter to remove lithium chloride (LiCl), thereby obtaining 36 mg (yield: 47%) of a composition of hybrid transition metal compounds.

The structure of the hybrid (3:2) transition metal compounds of the compound of Formula 1-1 (bis(n-propylcyclopentadienyl) hafnium dichloride) and the compound of Formula 2-1 ((pentamethylcyclopentadienyl)(n-propylcyclopentadienyl) hafnium dichloride) was confirmed by $^1H$ NMR. The compound of Formula 3-1 (bis(pentamethylcyclopentadienyl)hafnium dichloride) was present in a trace amount.

$^1H$-NMR ($CDCl_3$, 300 MHz) 6.20-6.14 (m, 6H), 6.12-6.07 (m, 6H), 5.94-5.92 (m, 2H), 5.89-5.87 (m, 2H), 2.65-2.58 (m, 4H), 2.07 (s, 15H), 1.60-1.52 (m, 4H), 0.95-0.89 (m, 6H).

Example 2

48 mg (yield: 62%) of a composition of hybrid transition metal compounds was obtained in the same manner as in Example 1, except that lithium n-propylcyclopentadienide of Formula 4-1, lithium pentamethylcyclopentadienide of Formula 5-1, and hafnium chloride were used in amounts of 18 mg (0.16 mmole, 1 eq.), 22 mg (0.16 mmole, 1 eq.), and 50 mg (0.16 mmole, 1 eq.), respectively.

The structure of the hybrid (2:3) transition metal compounds of the compound of Formula 1-1 and the compound of Formula 2-1 was confirmed by $^{1}H$ NMR. The compound of Formula 3-1 was present in a trace amount.

$^{1}H$-NMR ($CDCl_3$, 300 MHz) 6.20-6.14 (m, 4H), 6.12-6.07 (m, 4H), 5.94-5.92 (m, 3H), 5.89-5.87 (m, 3H), 2.65-2.58 (m, 7H), 2.07 (s, 22.5H), 1.60-1.52 (m, 7H), 0.95-0.89 (m, 10.5H).

Example 3

48 mg (yield: 63%) of a composition of hybrid transition metal compounds was obtained in the same manner as in Example 1, except that lithium n-propylcyclopentadienide of Formula 4-1, lithium pentamethylcyclopentadienide of Formula 5-1, and hafnium chloride were used in amounts of 12 mg (0.10 mmole, 1 eq.), 30 mg (0.21 mmole, 2 eq.), and 50 mg (0.16 mmole, 1.5 eq.), respectively.

The structure of the hybrid (2:3) transition metal compounds of the compound of Formula 1-1 and the compound of Formula 2-1 was confirmed by $^{1}H$ NMR. The compound of Formula 3-1 was present in a trace amount.

$^{1}H$-NMR ($CDCl_3$, 300 MHz) 6.20-6.14 (m, 4H), 6.12-6.07 (m, 4H), 5.94-5.92 (m, 3H), 5.89-5.87 (m, 3H), 2.65-2.58 (m, 7H), 2.07 (s, 22.5H), 1.60-1.52 (m, 7H), 0.95-0.89 (m, 10.5H).

Example 4

107 mg (yield: 54%) of a composition of hybrid transition metal compounds was obtained in the same manner as in Example 1, except that lithium n-propylcyclopentadienide of Formula 4-1, lithium pentamethylcyclopentadienide of Formula 5-1, and hafnium chloride were used in amounts of 48 mg (0.42 mmole, 1 eq.), 60 mg (0.42 mmole, 1 eq.), and 135 mg (0.42 mmole, 1 eq.), respectively, and that the reaction was carried out at room temperature.

The structure of the hybrid (2:1) transition metal compounds of the compound of Formula 1-1 and the compound of Formula 2-1 was confirmed by $^{1}H$ NMR. The compound of Formula 3-1 was present in a trace amount.

$^{1}H$-NMR ($CDCl_3$, 300 MHz) 6.20-6.14 (m, 8H), 6.12-6.07 (m, 8H), 5.94-5.92 (m, 2H), 5.89-5.87 (m, 2H), 2.65-2.58 (m, 10H), 2.07 (s, 15H), 1.60-1.52 (m, 10H), 0.95-0.89 (m, 15H).

Example 5

45 mg (yield: 59%) of a composition of hybrid transition metal compounds was obtained in the same manner as in Example 2, except that the reaction was carried out at 100° C.

The structure of the hybrid (6:3:1) transition metal compounds of the compound of Formula 1-1, the compound of Formula 2-1, and the compound of Formula 3-1, was confirmed by $^{1}H$ NMR.

$^{1}H$-NMR ($CDCl_3$, 300 MHz) 6.20-6.14 (m, 8H), 6.12-6.07 (m, 8H), 5.94-5.92 (m, 2H), 5.89-5.87 (m, 2H), 2.65-2.58 (m, 10H), 2.07 (s, 15H), 2.03 (s, 10H), 1.60-1.52 (m, 10H), 0.95-0.89 (m, 15H).

The reactants and the ratio of products of the Examples are shown in Table 1 below.

TABLE 1

| Ex- | Reactant (eq.) | | Reaction | Product (molar ratio) | | | |
|---|---|---|---|---|---|---|---|
| ample | Formula 4-1 | Formula 5-1 | temp. (° C.) | Formula 1-1 | Formula 2-1 | Formula 3-1 | Yield (%) |
| 1 | 2 | 1 | 60 | 3 | 2 | — | 47 |
| 2 | 1 | 1 | 60 | 2 | 3 | — | 62 |
| 3 | 1 | 2 | 60 | 2 | 3 | — | 63 |
| 4 | 1 | 1 | Room temp. | 2 | 1 | — | 54 |
| 5 | 1 | 1 | 100 | 6 | 3 | 1 | 59 |

INDUSTRIAL APPLICABILITY

In the hybrid catalytic composition comprising different transition metal compounds and the catalyst for olefin polymerization comprising the same according to embodiments of the present invention, it is possible to prepare various polyolefins having excellent processability and mechanical properties depending on the content of the corresponding transition metal compounds.

In addition, in the processes for preparing a hybrid catalytic composition and for preparing a catalyst for olefin polymerization comprising the same, it is possible to easily provide a catalyst for polymerization of polyolefins having excellent processability and mechanical properties by precisely controlling the ratio of the hybrid transition metal compounds.

The invention claimed is:

1. A hybrid catalytic composition comprising at least two kinds of the transition metal compounds that are different from each other, wherein the at least two kinds of transition metal compounds comprise at least one transition metal compound represented by Formulae 1-1 to 1-12, at least one transition metal compound represented by Formulae 2-1 to 2-12, or at least one transition metal compound represented by Formulae 3-1 to 3-12:

[Formula 1]

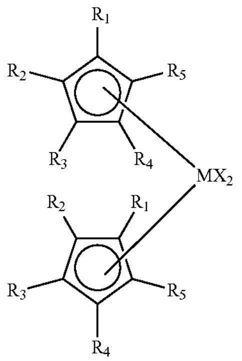

[Formula 2]

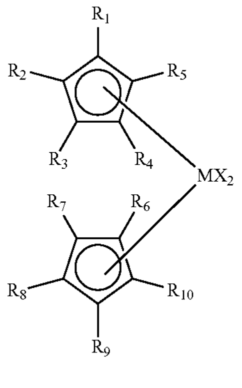

-continued

[Formula 3]

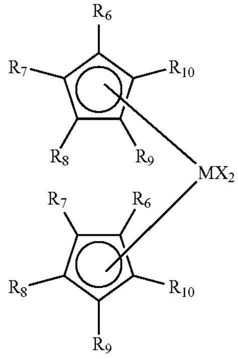

in Formulae 1 to 3, M is each titanium (Ti), zirconium (Zr), or hafnium (Hf),

X is each independently halogen, $C_{1-20}$ alkyl, $C_{2-20}$ alkenyl, $C_{2-20}$ alkynyl, $C_{6-20}$ aryl, $C_{1-20}$ alkyl $C_{6-20}$ aryl, $C_{6-20}$ aryl $C_{1-20}$ alkyl, $C_{1-20}$ alkylamido, or $C_{6-20}$ arylamido, $R_1$ to $R_5$ and $R_6$ to $R_{10}$ are each independently hydrogen, substituted or unsubstituted $C_{1-20}$ alkyl, substituted or unsubstituted $C_{2-20}$ alkenyl, substituted or unsubstituted $C_{6-20}$ aryl, substituted or unsubstituted $C_{1-20}$ alkyl $C_{6-20}$ aryl, substituted or unsubstituted $C_{6-20}$ aryl $C_{1-20}$ alkyl, substituted or unsubstituted $C_{1-20}$ heteroalkyl, substituted or unsubstituted $C_{2-20}$ heteroaryl, substituted or unsubstituted $C_{1-20}$ alkylamido, substituted or unsubstituted $C_{6-20}$ arylamido, or substituted or unsubstituted $C_{1-20}$ silyl, and $R_1$ to $R_5$ and $R_6$ to $R_{10}$ each independently may be linked to adjacent groups to form a substituted or unsubstituted, saturated or unsaturated $C_{4-20}$ ring,

[Formula 1-1]

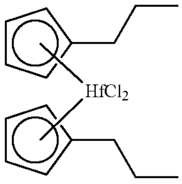

[Formula 1-2]

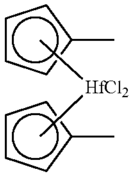

[Formula 1-3]

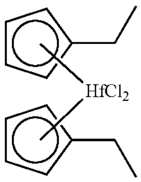

-continued

[Formula 1-4]

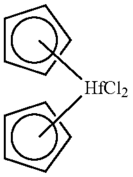

[Formula 1-5]

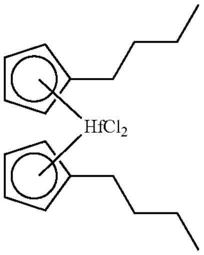

[Formula 1-6]

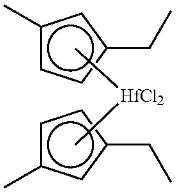

[Formula 1-7]

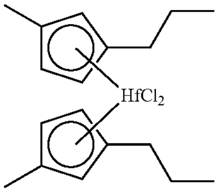

[Formula 1-8]

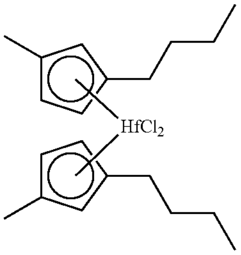

[Formula 1-9]

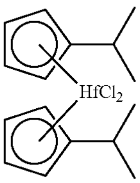

[Formula 1-10]

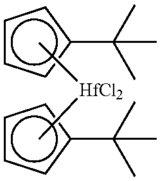

-continued
[Formula 1-11]
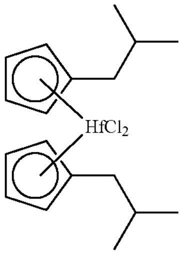
[Formula 1-12]
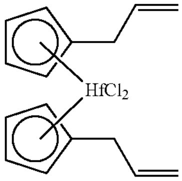
[Formula 2-1]
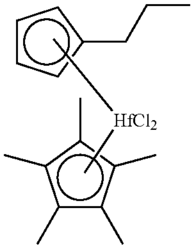
[Formula 2-2]
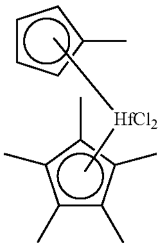
[Formula 2-3]
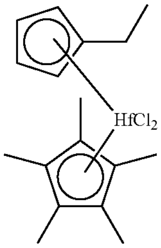
[Formula 2-4]
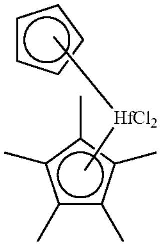
-continued
[Formula 2-5]
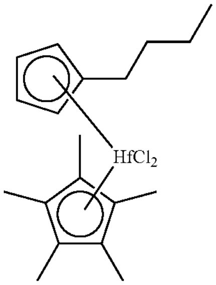
[Formula 2-6]
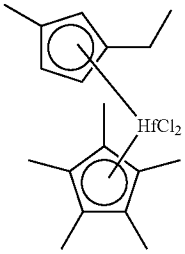
[Formula 2-7]
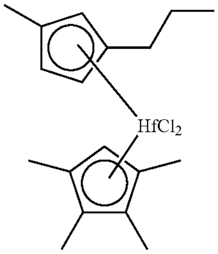
[Formula 2-8]
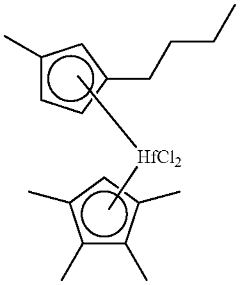
[Formula 2-9]
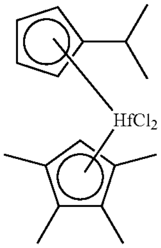
[Formula 2-10]
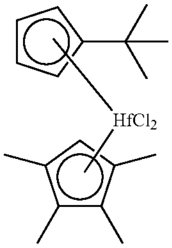

-continued
[Formula 2-11]
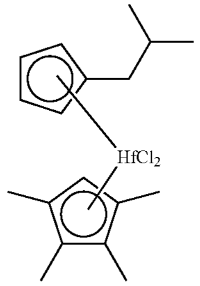
[Formula 2-12]
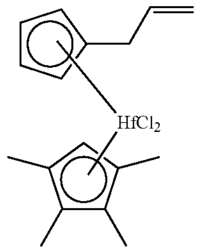
[Formula 3-1]
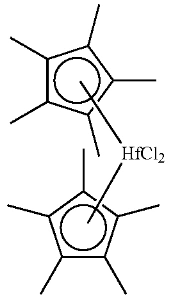
[Formula 3-2]
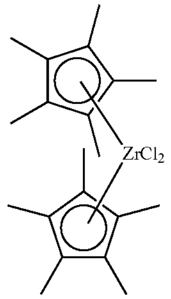
[Formula 3-3]
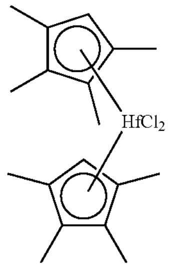
-continued
[Formula 3-4]
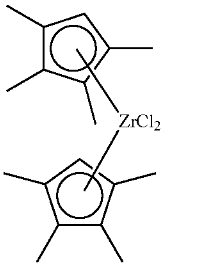
[Formula 3-5]
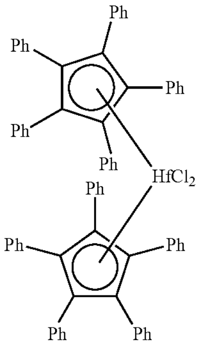
[Formula 3-6]
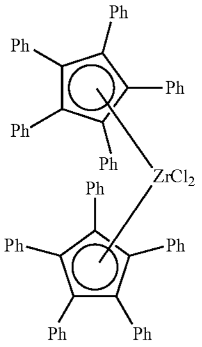
[Formula 3-7]
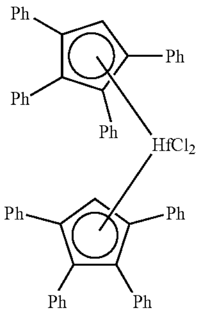
[Formula 3-8]
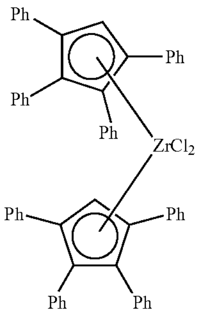

-continued

[Formula 3-9]

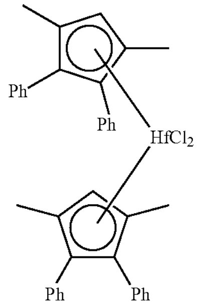

[Formula 3-10]

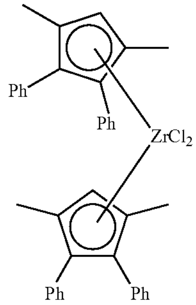

[Formula 3-11]

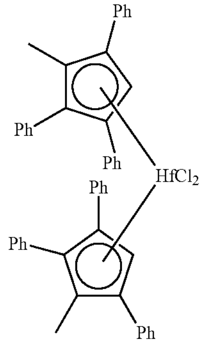

[Formula 3-12]

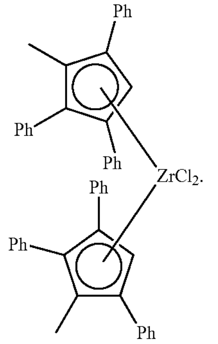

2. A catalyst for olefin polymerization, which comprises the hybrid catalytic composition of claim 1; and a cocatalyst compound.

3. The catalyst for olefin polymerization of claim 2, wherein the cocatalyst compound is at least one selected from the group consisting of a compound represented by Formula 7, a compound represented by Formula 8, and compound represented by Formula 9:

[Formula 7]

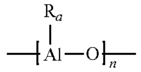

[Formula 8]

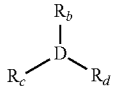

[Formula 9]

$[L\text{-}H]^+[Z(A)_4]^-$ or $[L]^+[Z(A)_4]^-$ in Formula 7, n is an integer of 2 or more, and R may each independently be a halogen atom, $C_{1-20}$ hydrocarbon, or $C_{1-20}$ hydrocarbon substituted with halogen, in Formula 8, D is aluminum (Al) or boron (B), and $R_b$, $R_c$, and $R_d$ are each independently a halogen atom, $C_{1-20}$ hydrocarbon, $C_{1-20}$ hydrocarbon substituted with halogen, or $C_{1-20}$ alkoxy, and in Formula 9, L is a neutral Lewis acid, $[L\text{-}H]^+$ is Brönsted acid or a conjugate acid of L, $[L]^+$ is a cationic Lewis acid, Z is a group 13 element, and A is each independently substituted or unsubstituted $C_{6-20}$ aryl or substituted or unsubstituted $C_{1-20}$ alkyl.

4. The catalyst for olefin polymerization of claim 3, wherein the compound represented by Formula 7 is at least one selected from the group consisting of methylaluminoxane, ethylaluminoxane, isobutylaluminoxane, and butylaluminoxane.

5. The catalyst for olefin polymerization of claim 3, wherein the compound represented by Formula 8 is at least one selected from the group consisting of trimethylaluminum, triethylaluminum, triisobutylaluminum, tripropylaluminum, tributylaluminum, dimethylchloroaluminum, triisopropylaluminum, tri-s-butylaluminum, tricyclopentylaluminum, tripentylaluminum, triisopentyaluminum, trihexyaluminum, trioctyaluminum, ethyldimethylaluminum, methyldiethylaluminum, triphenylaluminum, trip-tolylaluminum, dimethylaluminummethoxide, dimethylaluminumethoxide, trimethylboron, triethylboron, triisobutylboron, tripropylboron, and tributylboron.

6. The catalyst for olefin polymerization of claim 3, wherein the compound represented by Formula 9 is at least one selected from the group consisting of triethylammonium tetraphenylborate, tributylammonium tetraphenylborate, trimethylammonium tetraphenylborate, tripropylammonium tetraphenylborate, trimethylammonium tetra(p-tolyl)borate, trimethylammonium tetrakis(o,p-dimethylphenyl)borate, tributylammonium tetrakis(p-trifluoromethylphenyl)borate, trimethylammonium tetrakis(p-trifluoromethylphenyl)borate, tributylammonium tetrakis(pentafluorophenyl)borate, N,N-diethylanilinium tetraphenylborate, N,N-diethylanilinium tetrakis(pentafluorophenyl)borate, diethylammonium tetrakis(pentafluorophenyl)borate, triphenylphosphonium tetraphenylborate, trimethylphosphonium tetraphenylborate, triethylammonium tetraphenylaluminate, tributylammonium tetraphenylaluminate, trimethylammonium tetraphenylaluminate, tripropylammonium tetraphenylaluminate, trimethylammonium tetra(p-tolyl)aluminate, tripropylammonium tetra(p-tolyl)aluminate, triethylammonium tetrakis(o, p-dimethylphenyl)aluminate, tributylammonium tetrakis(p-trifluoromethylphenyl)aluminate, trimethylammonium tetrakis(p-trifluoromethylphenyl) aluminate, tributylammonium tetrakis(pentafluorophenyl) aluminate, N,N-diethylanilinium tetraphenylaluminate, N,N-diethylanilinium tetrakis(pentafluorophenyl)aluminate, diethylammonium tetraphenylaluminate, triphenylphosphonium tetraphenylaluminate, trimethylphosphonium tetraphenylaluminate, tripropylammonium tetra(p-tolyl)borate, triethylammonium tetrakis(o,p-dimethylphenyl)borate, triphenylcarbeniumtetrakis(p-trifluoromethylphenyl)borate, and triphenylcarbeniumtetrakis(pentafluorophenyl)borate.

7. The catalyst for olefin polymerization of claim 2, which further comprises a carrier for supporting the hybrid catalytic composition, the cocatalyst compound, or both.

8. The catalyst for olefin polymerization of claim 7, wherein the carrier comprises at least one selected from the group consisting of silica, alumina, and magnesia.

9. The catalyst for olefin polymerization of claim 7, wherein a total amount of the transition metal compounds supported on the carrier is 0.001 to 1 mmole based on 1 g of the carrier, and an amount of the cocatalyst compound supported on the carrier is 2 to mmoles based on the 1 g of the carrier.

10. A process for preparing a hybrid catalytic composition, which comprises (1) dissolving a compound represented by Formula 4 and a compound represented by Formula 5 in a solvent; and (2) adding a compound represented by Formula 6 to a solution obtained in step (1) and reacting it under stirring to obtain a hybrid catalytic composition comprising at least two kinds of the transition metal compounds represented by Formulae 1 to 3, wherein a molar ratio of the compound represented by Formula 4 to the compound represented by Formula 5 is in the range of 10:1 to 1:10, wherein the compound represented by Formula 4 is at least one of the compounds represented by Formulae 4-1 to 4-12, and the compound represented by Formula 5 is at least one of the compounds represented by Formulae 5-1 to 5-6:

[Formula 1]

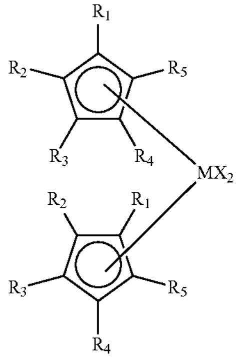

[Formula 2]

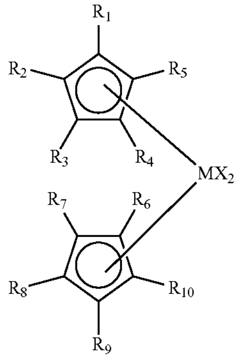

-continued

[Formula 3]

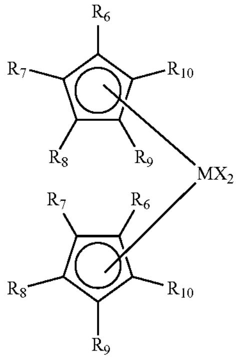

[Formula 4]

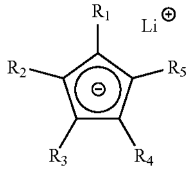

[Formula 5]

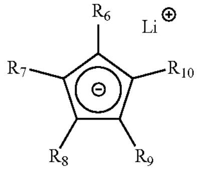

[Formula 6]

$MX_4$ in Formulae 1 to 6,

M is each titanium (Ti), zirconium (Zr), or hafnium (Hf),

X is each independently halogen, $C_{1-20}$ alkyl, $C_{2-20}$ alkenyl, $C_{2-20}$ alkynyl, $C_{6-20}$ aryl, $C_{1-20}$ alkyl $C_{6-20}$ aryl, $C_{6-20}$ aryl $C_{1-20}$ alkyl, $C_{1-20}$ alkylamido, or $C_{6-20}$ arylamido, $R_1$ to $R_5$ and $R_6$ to $R_{10}$ are each independently hydrogen, substituted or unsubstituted $C_{1-20}$ alkyl, substituted or unsubstituted $C_{2-20}$ alkenyl, substituted or unsubstituted $C_{6-20}$ aryl, substituted or unsubstituted $C_{1-20}$ alkyl $C_{6-20}$ aryl, substituted or unsubstituted $C_{6-20}$ aryl $C_{1-20}$ alkyl, substituted or unsubstituted $C_{1-20}$ heteroalkyl, substituted or unsubstituted $C_{3-20}$ heteroaryl, substituted or unsubstituted $C_{1-20}$ alkylamido, substituted or unsubstituted $C_{6-20}$ arylamido, or substituted or unsubstituted $C_{1-20}$ silyl, and $R_1$ to $R_5$ and $R_6$ to $R_{10}$ each independently may be linked to adjacent groups to form a substituted or unsubstituted, saturated or unsaturated $C_{4-20}$ ring,

[Formula 4-1]

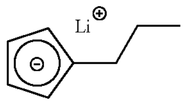

[Formula 4-2]

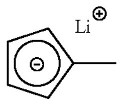

-continued

[Formula 4-3]

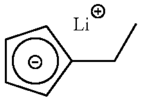

[Formula 4-4]

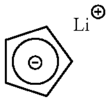

[Formula 4-5]

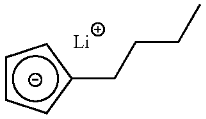

[Formula 4-6]

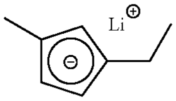

[Formula 4-7]

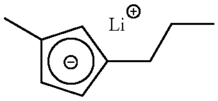

[Formula 4-8]

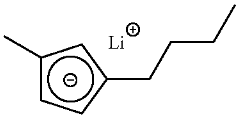

[Formula 4-9]

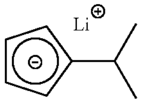

[Formula 4-10]

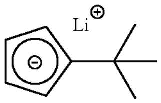

[Formula 4-11]

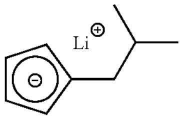

[Formula 4-12]

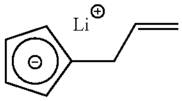

[Formula 5-1]

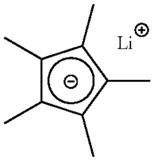

[Formula 5-2]

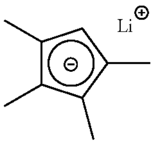

-continued

[Formula 5-3]

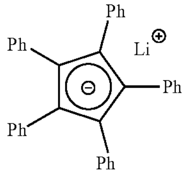

[Formula 5-4]

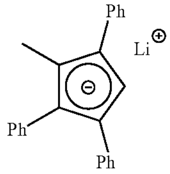

[Formula 5-5]

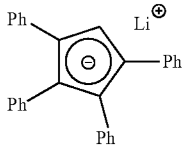

[Formula 5-6]

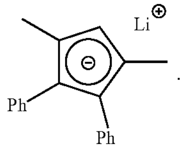

11. The process for preparing a hybrid catalytic composition of claim 10, wherein the compound represented by Formula 6 is $ZrCl_4$ or $HfCl_4$.

12. The process for preparing a hybrid catalytic composition of claim 10, wherein the solvent comprises at least one selected from the group consisting of hexane, pentane, toluene, benzene, dichloromethane, diethyl ether, tetrahydrofuran, acetone, and ethyl acetate.

13. The process for preparing a hybrid catalytic composition of claim 10, wherein a reaction temperature in step (2) is −30° C. to 120° C.

14. The process for preparing a hybrid catalytic composition of claim 10, which further comprises (2') drying the hybrid catalytic composition obtained in step (2).

15. The process for preparing a hybrid catalytic composition of claim 14, which further comprises (2") dissolving a dried hybrid catalytic composition obtained in step (2') in a solvent and then removing unreacted substances and/or impurities with a filter.

16. The process for preparing a hybrid catalytic composition of claim 15, wherein the solvent comprises at least one selected from the group consisting of hexane, pentane, toluene, benzene, dichloromethane, diethyl ether, tetrahydrofuran, acetone, and ethyl acetate.

17. A process for preparing a catalyst for olefin polymerization, which comprises (1) dissolving a compound represented by Formula 4 and a compound represented by Formula 5 in a solvent; (2) adding a compound represented by Formula 6 to a solution obtained in step (1) and reacting it under stirring to obtain a hybrid catalytic composition comprising at least two kinds of the transition metal compounds represented by Formulae 1 to 3; and (3) supporting the hybrid catalytic composition obtained in step (2), a cocatalyst compound, or both on a carrier, wherein a molar ratio of the compound represented by Formula 4 to the compound represented by Formula 5 is in the range of 10:1 to 1:10, wherein the compound represented by Formula 4 is at least one of the compounds represented by Formulae 4-1 to 4-12, and the compound represented by Formula 5 is at least one of the compounds represented by Formulae 5-1 to 5-6:

[Formula 1]

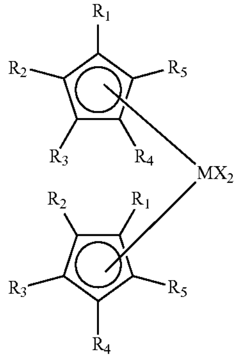

[Formula 2]

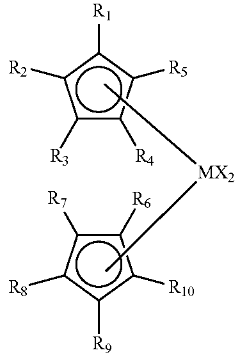

[Formula 3]

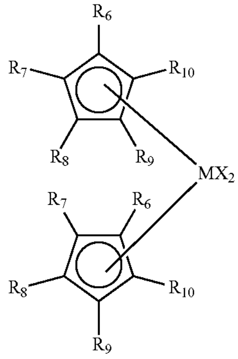

[Formula 4]

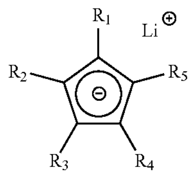

[Formula 5]

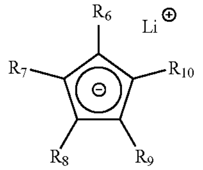

-continued

[Formula 6]

$MX_4$ in Formulae 1 to 6,

M is each titanium (Ti), zirconium (Zr), or hafnium (Hf),

X is each independently halogen, $C_{1-20}$ alkyl, $C_{2-20}$ alkenyl, $C_{2-20}$ alkynyl, $C_{6-20}$ aryl, $C_{1-20}$ alkyl $C_{6-20}$ aryl, $C_{6-20}$ aryl $C_{1-20}$ alkyl, $C_{1-20}$ alkylamido, or $C_{6-20}$ arylamido, $R_1$ to $R_5$ and $R_6$ to $R_{10}$ are each independently hydrogen, substituted or unsubstituted $C_{1-20}$ alkyl, substituted or unsubstituted $C_{2-20}$ alkenyl, substituted or unsubstituted $C_{6-20}$ aryl, substituted or unsubstituted $C_{1-20}$ alkyl $C_{6-20}$ aryl, substituted or unsubstituted $C_{6-20}$ aryl $C_{1-20}$ alkyl, substituted or unsubstituted $C_{1-20}$ heteroalkyl, substituted or unsubstituted $C_{3-20}$ heteroaryl, substituted or unsubstituted $C_{1-20}$ alkylamido, substituted or unsubstituted $C_{6-20}$ arylamido, or substituted or unsubstituted $C_{1-20}$ silyl, and $R_1$ to $R_5$ and $R_6$ to $R_{10}$ each independently may be linked to adjacent groups to form a substituted or unsubstituted, saturated or unsaturated $C_{4-20}$ ring,

[Formula 4-1]

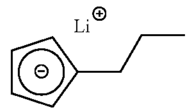

[Formula 4-2]

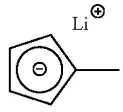

[Formula 4-3]

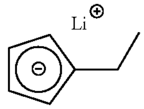

[Formula 4-4]

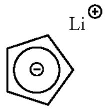

[Formula 4-5]

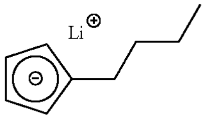

[Formula 4-6]

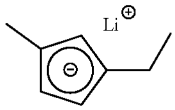

[Formula 4-7]

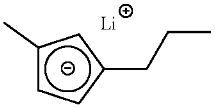

[Formula 4-8]

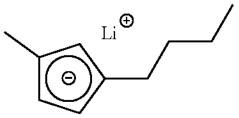

-continued
[Formula 4-9]
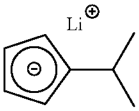
[Formula 4-10]
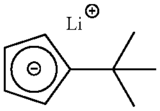
[Formula 4-11]
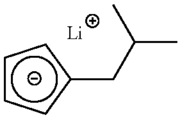
[Formula 4-12]
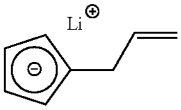
[Formula 5-1]
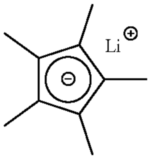
[Formula 5-2]
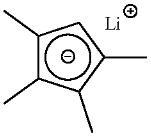
-continued
[Formula 5-3]
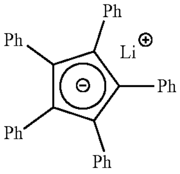
[Formula 5-4]
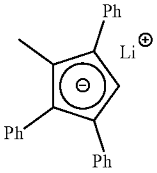
[Formula 5-5]
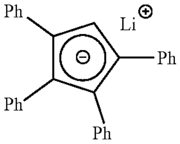
[Formula 5-6]
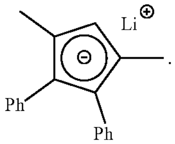
* * * * *